(12) United States Patent
Hashimoto et al.

(10) Patent No.: US 11,317,205 B2
(45) Date of Patent: Apr. 26, 2022

(54) INFORMATION PROCESSING APPARATUS, INFORMATION PROCESSING METHOD, PROGRAM, AND MOBILE OBJECT

(71) Applicants: Sony Corporation, Tokyo (JP); Sony Semiconductor Solutions Corporation, Kanagawa (JP)

(72) Inventors: Hirokazu Hashimoto, Kanagawa (JP); Ryosuke Tanaka, Saitama (JP); Yuki Yamamoto, Tokyo (JP); Toru Chinen, Kanagawa (JP)

(73) Assignees: Sony Corporation, Tokyo (JP); Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/496,121

(22) PCT Filed: Mar. 15, 2018

(86) PCT No.: PCT/JP2018/010125
§ 371 (c)(1),
(2) Date: Sep. 20, 2019

(87) PCT Pub. No.: WO2018/180523
PCT Pub. Date: Oct. 4, 2018

(65) Prior Publication Data
US 2020/0100028 A1 Mar. 26, 2020

(30) Foreign Application Priority Data
Mar. 29, 2017 (JP) .............................. JP2017-064276

(51) Int. Cl.
*H04R 3/12* (2006.01)
*G08G 1/16* (2006.01)
(Continued)

(52) U.S. Cl.
CPC ............... *H04R 3/12* (2013.01); *G08G 1/166* (2013.01); *H04R 1/025* (2013.01); *H04R 1/403* (2013.01);
(Continued)

(58) Field of Classification Search
CPC .......... H04R 3/12; H04R 1/025; H04R 1/403; H04R 2430/01; H04R 2499/13;
(Continued)

(56) References Cited

U.S. PATENT DOCUMENTS 5,450,057 A * 9/1995 Watanabe ................ B60Q 9/00
340/435
9,896,031 B1 * 2/2018 Groh ....................... B60Q 9/008
(Continued)

FOREIGN PATENT DOCUMENTS

CN 104924979 A 9/2015
GB 2534163 A 7/2016
(Continued)

OTHER PUBLICATIONS

International Search Report and English translation thereof dated Jun. 19, 2018 in connection with International Application No. PCT/JP2018/010125.
(Continued)

*Primary Examiner* — Brian Wilson
(74) *Attorney, Agent, or Firm* — Wolf, Greenfield & Sacks, P.C.

(57) ABSTRACT

This technology relates to an information processing apparatus for accurately notifying a mobile object of a position of a moving body nearby, and to an information processing method, a program, and a mobile object for use with the information processing apparatus. The information processing apparatus includes a moving body detection section that detects the moving body near the mobile object on the basis
(Continued)

of information input from sensors, and a sound output control section that shifts the position of a sound image of a notification sound giving notification of the position of the moving body in keeping with a detected position thereof in motion. This technology can be applied to apparatuses, systems, or vehicles that provide driver assistance for preventing collision or contact with the moving body, for example.

19 Claims, 14 Drawing Sheets

(51) Int. Cl.
*H04R 1/02* (2006.01)
*H04R 1/40* (2006.01)
*B60Q 9/00* (2006.01)

(52) U.S. Cl.
CPC .......... *B60Q 9/008* (2013.01); *H04R 2430/01* (2013.01); *H04R 2499/13* (2013.01)

(58) Field of Classification Search
CPC ........ H04R 3/00; G08G 1/166; G08G 1/0962; G08G 1/16; B60Q 9/008; B60R 11/02; B60R 99/00; H04S 7/00
See application file for complete search history.

(56) References Cited

U.S. PATENT DOCUMENTS

| | | | |
|---|---|---|---|
| 2005/0195092 A1* | 9/2005 | Takahashi | G08G 1/096827 340/692 |
| 2010/0060441 A1* | 3/2010 | Iwamoto | B60W 50/14 340/435 |
| 2014/0198933 A1 | 7/2014 | Totsuka et al. | |
| 2014/0294210 A1* | 10/2014 | Healey | G06F 3/165 381/302 |
| 2015/0029012 A1 | 1/2015 | Mitani et al. | |
| 2015/0110285 A1 | 4/2015 | Censo et al. | |
| 2015/0365743 A1* | 12/2015 | Konigsberg | H04R 3/00 381/86 |
| 2018/0096601 A1* | 4/2018 | Chow | G08G 1/166 |

FOREIGN PATENT DOCUMENTS

| | | |
|---|---|---|
| JP | 2001-157300 A | 6/2001 |
| JP | 2005-329754 A | 12/2005 |
| JP | 2009-042843 A | 2/2009 |
| JP | 2009-245340 A | 10/2009 |
| JP | 2015-057686 A | 3/2015 |
| WO | 2006/109390 A1 | 10/2006 |
| WO | 2008/075407 A1 | 6/2008 |
| WO | 2014/024247 A1 | 2/2014 |

OTHER PUBLICATIONS

International Written Opinion and English translation thereof dated Jun. 19, 2018 in connection with International Application No. PCT/JP2018/010125.
International Preliminary Report on Patentability and English translation thereof dated Oct. 10, 2019 in connection with International Application No. PCT/JP2018/010125.
Extended European Search Report dated Mar. 24, 2020 in connection with European Application No. 18775071.6.

* cited by examiner

INFORMATION PROCESSING APPARATUS, INFORMATION PROCESSING METHOD, PROGRAM, AND MOBILE OBJECT

CROSS-REFERENCE TO RELATED APPLICATIONS

This application claims the benefit under 35 U.S.C. § 371 as a U.S. National Stage Entry of International Application No. PCT/JP2018/010125, filed in the Japanese Patent Office as a Receiving office on Mar. 15, 2018, which claims priority to Japanese Patent Application Number JP2017-064276, filed in the Japanese Patent Office on Mar. 29, 2017, each of which is hereby incorporated by reference in its entirety.

TECHNICAL FIELD

The present technology relates to an information processing apparatus, an information processing method, a program, and a mobile object. More particularly, the technology relates to an information processing apparatus for accurately notifying a mobile object of the position of a moving body nearby, as well as to an information processing method, a program, and the mobile object for use with the information processing apparatus.

BACKGROUND ART

In the past, based on the timing at which an own vehicle enters an intersection, on the manner in which the own vehicle passes therethrough, on the timing at which another vehicle enters the intersection, and on the manner in which the other vehicle passes therethrough, it has been proposed to select a speaker that outputs a guidance voice for guiding the other vehicle (e.g., see PTL 1).

Also in the past, it has been proposed to localize a sound image of warning information in the direction of an obstacle relative to the own vehicle or to its driver (e.g., see PTL 2).

CITATION LIST

Patent Literature

[PTL 1]
  Japanese Patent Laid-open No. 2009-245340
[PTL 2]
  PCT Patent Publication No. WO2008/075407

SUMMARY

Technical Problem

Meanwhile, it has been desired to notify the vehicle of the position of a moving body nearby more accurately in order to avoid collision or contact with that moving body.

The present technology has been devised in view of the above circumstances and aims to accurately notify a mobile object such as a vehicle of the position of a moving body nearby.

Solution to Problem

According to a first aspect of the present technology, there is provided an information processing apparatus including: a moving body detection section configured to detect a moving body near a mobile object on the basis of information input from sensors; and a sound output control section configured to shift a position of a sound image of a notification sound giving notification of the position of the moving body in keeping with the detected position of the moving body in motion.

The information processing apparatus can further include a motion prediction section configured to predict the motion of the moving body. The sound output control section can shift the position of the sound image of the notification sound on the basis of a predicted position of the moving body.

From the time the position of the sound image of the notification sound is set on the basis of a first detected position of the moving body until the position of the sound image of the notification sound is set on the basis of a second detected position of the moving body subsequent to the first detected position, the sound output control section can set the position of the sound image of the notification sound in accordance with the predicted position of the moving body.

The motion prediction section can further predict the motion of the mobile object. The sound output control section can shift the position of the sound image of the notification sound on the basis of the predicted position of the moving body relative to the predicted position of the mobile object.

The sound output control section can control the volume of the notification sound on the basis of a distance between the mobile object and the moving body.

The sound output control section can change a type of the notification sound depending on the type of the moving body.

In a case where there are multiple moving bodies of the same type near the mobile object, the sound output control section can change the type of the notification second for each of the moving bodies.

The information processing apparatus can further include a priority setting section configured to set a priority for the moving body. The sound output control section can control the output of the notification sound regarding each of multiple moving bodies on the basis of the priority thereof.

The sound output control section can perform control to preferentially output the notification sound regarding the moving body having a high priority.

The sound output control section can control the volume of the notification sound on the basis of the priority.

The priority setting section can set the priority for each moving body on the basis of a risk level at which the moving body can contact or collide with the mobile object.

The sound output control section can perform control to output the notification sound regarding the moving body that comes into a predetermined range of vicinity of the mobile object.

The sound output control section can control an up-down-direction position of the sound image of the notification sound on the basis of the up-down-direction position of the moving body in reference to a plane on which the moving body exists.

The sound output control section can control the up-down-direction position of the sound image of the notification sound by controlling the output of sounds from multiple speakers arranged at different heights in the mobile object.

The sound output control section can control the output of sounds from multiple speakers arranged in the mobile object in a manner surrounding a driver of the mobile object.

The sound output control section can shift the position of the sound image of the notification sound in keeping with the detected position of the moving body in motion relative to the mobile object.

Also according to the first aspect of the present technology, there is provided an information processing method including: a moving body detection step for detecting a moving body near a mobile object on the basis of information input from sensors; and a sound output control step for shifting the position of a sound image of a notification sound giving notification of a position of the moving body in keeping with a detected position of the moving body in motion.

Also according to the first aspect of the present technology, there is provided a program for causing a computer to execute a process including: a moving body detection step for detecting a moving body near a mobile object on the basis of information input from sensors; and a sound output control step for shifting a position of a sound image of a notification sound giving notification of the position of the moving body in keeping with the detected position of the moving body in motion.

According to a second aspect of the present technology, there is provided a mobile object including: sensors configured to be arranged in a mobile object to detect peripheral status thereof; a moving body detection section configured to detect a moving body nearby on the basis of information input from the sensors; and a sound output control section configured to shift the position of a sound image of a notification sound giving notification of a position of the moving body in keeping with a detected position of the moving body in motion.

Thus, according to the first and the second aspects of the present technology, the moving body near the mobile object is detected on the basis of information input from the sensors. The position of the sound image of the notification sound giving notification of the position of the moving body is shifted in keeping with the detected position of the moving body in motion.

Advantageous Effect of Invention

According to the first or the second aspect of the present technology, a mobile object is accurately notified of the position of a moving body nearby.

Note that the advantageous effects outlined above are not limitative of the present disclosure. Further advantages of the disclosure will become apparent from the ensuing description.

DESCRIPTION OF EMBODIMENTS

Some embodiments for implementing the present technology are described below. The description will be given under the following headings:

1. Embodiments
2. Variations
3. Others

1. EMBODIMENTS 1-1. Configuration Example of Onboard System

Figure 1:
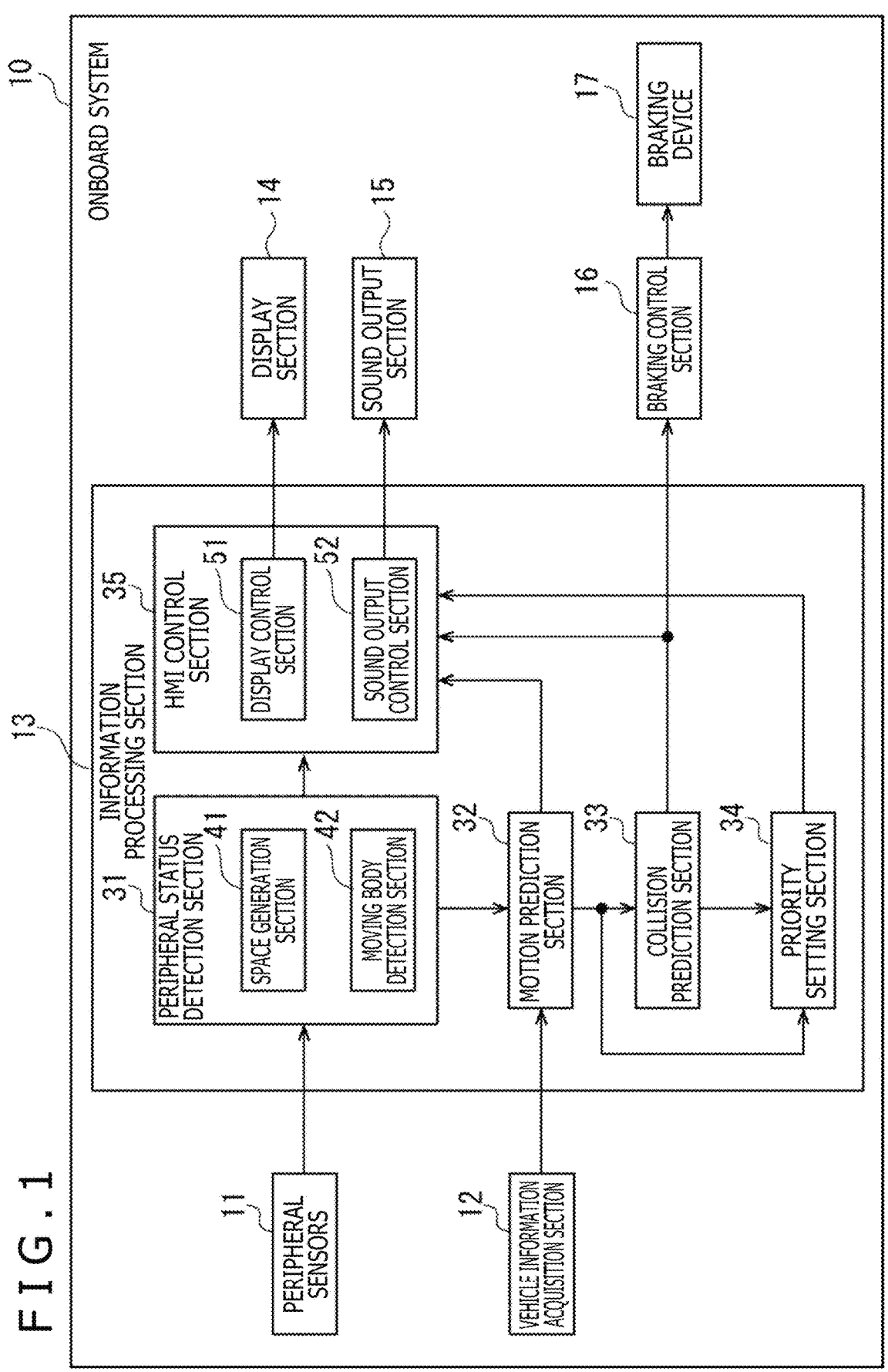
FIG. 1 is a block diagram depicting an embodiment of an onboard system to which the present technology is applied.

FIG. 1 is a block diagram depicting an embodiment of an onboard system to which the present technology is applied.

An onboard system 10 is a system mounted on board a vehicle for driver assistance. For example, the onboard system 10 performs processes to monitor the periphery of the vehicle so as to prevent collision or contact with a nearby moving body (e.g., vehicle, bicycle, or person). More specifically, the onboard system 10 gives notification of the position of a moving body near the vehicle, and controls braking devices such as a braking system for avoiding collision or contact with the moving body.

Note that the vehicle on which the onboard system 10 is mounted is not limited to anything specific. For example, the vehicles may include three-wheel trucks, small trucks, small passenger cars, large passenger cars, large buses, large trucks, large special-purpose vehicles, and small special-purpose vehicles. In the description that follows, the vehicle on which the onboard system 10 is mounted will be referred to as the own vehicle and any other vehicle as the other vehicle.

The onboard system 10 includes peripheral sensors 11, a vehicle information acquisition section 12, an information processing section 13, a display section 14, a sound output section 15, a braking control section 16, and a braking device 17.

The peripheral sensors 11 include various sensor for detecting the peripheral status of the own vehicle. For example, the peripheral sensors 11 include cameras (image sensors) for capturing the periphery of the own vehicle, close-range sensors for detecting objects near the own vehicle, and long-range sensors for detecting objects far away from the own vehicle. The close-range sensors may be ultrasonic sensors, for example. The long-range sensors may be radars, lidars, or TOF (Time-of-Flight) sensors, for example. Each of the peripheral sensors 11 supplies data indicative of information that includes the result of the detection (referred to as the peripheral sensor data hereunder) to a peripheral status detection section 31 in the information processing section 13.

Note that, in the ensuing description, images captured by the peripheral sensors 11 will be referred to as peripheral images and the data indicative of the peripheral images as peripheral image data. The peripheral image data is one type of peripheral sensor data.

The vehicle information acquisition section 12 includes various sensors used for predicting the motion of the own vehicle. For example, the vehicle information acquisition section 12 includes a speed sensor, a steering angle sensor, and a GNSS (Global Navigation Satellite System) receiver or the like. The vehicle information acquisition section 12 acquires operating information regarding the direction indicators of the own vehicle, information indicating the gear position of the own vehicle, and route information set on the navigation system or the like. The vehicle information acquisition section 12 supplies the acquired sensor data and information (generically referred to as the vehicle information hereunder) to a motion prediction section 32.

Note that, the sensors preinstalled on the own vehicle may be appropriated for use as the peripheral sensors 11 and as the vehicle information acquisition section 12.

The information processing section 13 may be configured with an ECU (Electronic Control Unit) or the like, for example. The information processing section 13 includes the peripheral status detection section 31, the motion prediction section 32, a collision prediction section 33, a priority setting section 34, and an HMI (Human Machine Interface) control section 35.

The peripheral status detection section 31 detects the peripheral status of the own vehicle on the basis of the peripheral sensor data. The peripheral status detection section 31 includes a space generation section 41 and a moving body detection section 42.

The space generation section 41 generates, based on the peripheral sensor data, a three-dimensional space map indicative of the shape and position of an object near the own vehicle. The space generation section 41 supplies the three-dimensional space map to the motion prediction section 32 and to the HMI control section 35. Also, the space generation section 41 supplies the HMI control section 35 with the peripheral image data out of the peripheral sensor data.

The moving body detection section 42 detects a moving body near the own vehicle based on the peripheral sensor data and on the three-dimensional space map. The moving body detection section 42 supplies the result of the moving body detection to the motion prediction section 32 and to the HMI control section 35.

The motion prediction section 32 predicts the motion of the own vehicle based on the vehicle information. Also, the motion prediction section 32 predicts the motion of a moving body near the own vehicle on the basis of the three-dimensional space map and the result of the moving body detection. The motion prediction section 32 supplies the result of predicting the motion of the own vehicle and that of the moving body near the own vehicle to the collision prediction section 33, to the priority setting section 34, and to the HMI control section 35.

The collision prediction section 33 predicts the collision of the own vehicle with a nearby moving body based on the result of predicting the motion of the own vehicle and that of the moving body near the own vehicle. The collision prediction section 33 supplies the result of the collision prediction to the priority setting section 34, to the HMI control section 35, and to the braking control section 16.

The priority setting section 34 sets the priority for notification of the position of each moving body (referred to as the notification priority hereunder) based on the result of predicting the motion of the own vehicle and that of the moving body near the own vehicle and on the result of the collision prediction. The priority setting section 34 supplies setting information regarding the notification priority to the HMI control section 35.

The HMI control section 35 performs HMI control of the own vehicle. The HMI control section 35 includes a display control section 51 and a sound output control section 52.

The display control section 51 controls the display of images (videos and still images) performed by the display section 14. For example, the display control section 51 generates periphery monitoring image data for displaying a periphery monitoring image indicative of the peripheral status of the own vehicle based on the three-dimensional space map, on the result of detecting the moving body near the own vehicle, on the result of predicting the motion of the moving body near the own vehicle, and on the result of the collision prediction. The display control section 51 supplies the periphery monitoring image data to the display section 14 causing the latter to display the periphery monitoring image.

The sound output control section 52 controls sound output from the sound output section 15. For example, the sound output control section 52 generates the sound data of a notification sound for notification of the position of the moving body near the own vehicle based on the result of detecting the moving body near the own vehicle, on the result of predicting the motion of the own vehicle and that of the moving body near the own vehicle, on the result of the collision prediction, and on the notification priority. The sound output control section 52 supplies the generated sound data to the sound output section 15 causing the latter to output the notification sound based on the sound data.

Furthermore, as will be discussed later, the sound output control section 52 localizes a sound image of the notification sound near the position of the corresponding moving body by use of sound image localization techniques. With the moving body in motion, the sound output control section 52 shifts accordingly the position of the sound image of the notification sound.

Incidentally, humans have an ability to perceive the direction of, and the distance to, a sound source using a time lag between the sounds reaching the right and left ears (known as the sound image localization ability). The sound image localization techniques involve controlling the position of a virtual sound source (sound image) perceived by humans through the use of the time lag and volume difference between the sounds that are output from multiple speakers.

The display section 14 is configured with any one of diverse displays or the like, for example. Under control of the HMI control section 35, the display section 14 displays various images including the periphery monitoring image or the like.

The sound output section 15 is configured with multiple speakers mounted on the own vehicle, for example. The sound output section 15 outputs sounds such as the notification sound based on the sound data supplied from the sound output control section 52.

The braking control section 16 is configured with an ECU (Electronic Control Unit), for example. On the basis of the result of the collision prediction by the collision prediction section 33, the braking control section 16 controls the braking device 17 to execute operations such as an emergency stop of the own vehicle.

The braking device 17 is configured with the braking system of the own vehicle, for example.

1-2. Arrangement Example of Speakers

Figure 2:
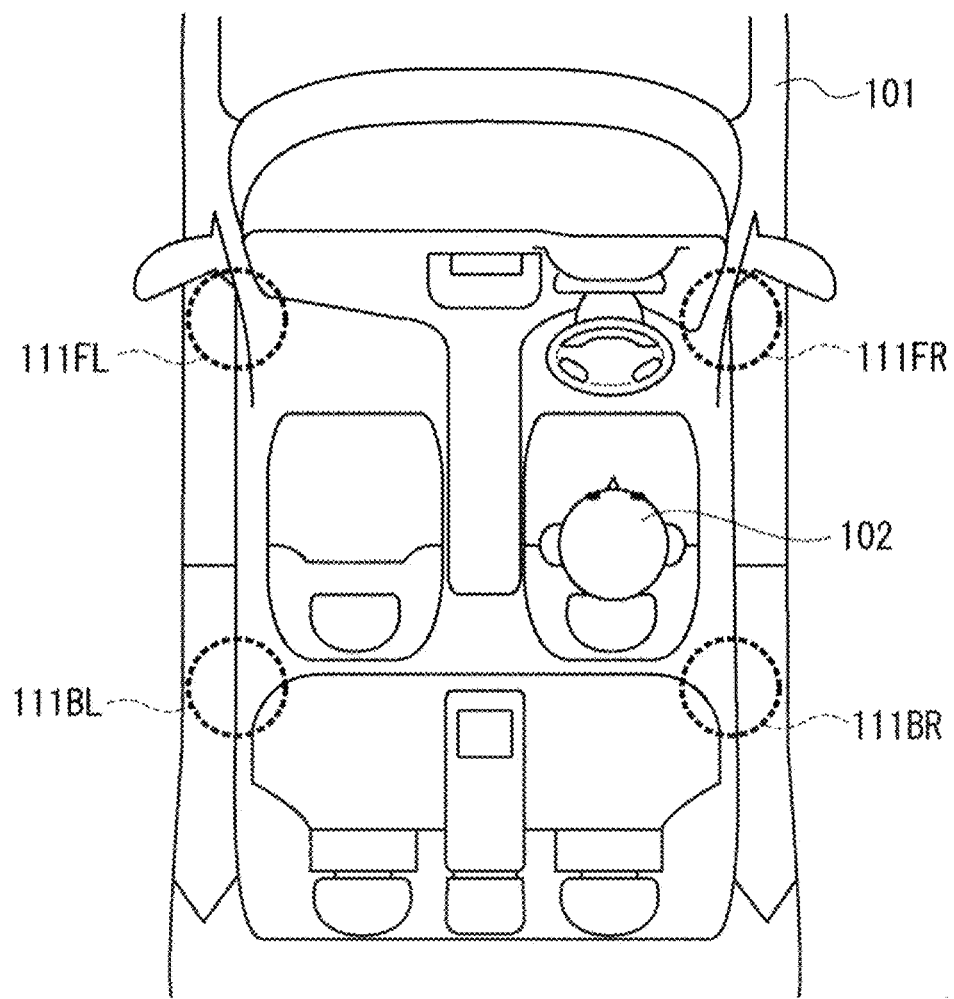
FIG. 2 is a schematic diagram depicting a first example of speaker installation positions.

FIG. 2 depicts an arrangement example of the speakers included in the sound output section 15.

For example, the sound output section 15 includes four speakers 111FL to 111BR. Note that, in FIG. 2, broken-line circles schematically indicate the positions of these speakers 111FL to 111BR.

The speakers 111FL to 111BR are arranged in a manner surrounding a driver 102 sitting in the driver's seat in the interior of a vehicle 101. Specifically, the speaker 111FL is at the front left of the driver 102 and arranged near the front end of the front passenger seat door of the vehicle 101. The speaker 111FR is at the front right of the driver 102 and arranged near the front end of the driver seat door of the vehicle 101. The speaker 111BL is at the back left of the driver 102 and arranged a little forward of the middle of the left backseat door of the vehicle 101. The speaker 111BR is at the back right of the driver 102 and arranged a little forward of the middle of the right backseat door of the vehicle 101. The speakers 111FL to 111BR are all installed in a manner facing the interior of the vehicle 101. The driver 102 is positioned inside a rectangular space with the speakers 111FL to 111BR positioned as its vertexes.

Note that, in a case where there is no need to individually distinguish the speakers 111FL to 111BR in the ensuing description, they will be simply referred to as the speaker 111.

1-3. First Embodiment of Notification Control Process

Figure 3:
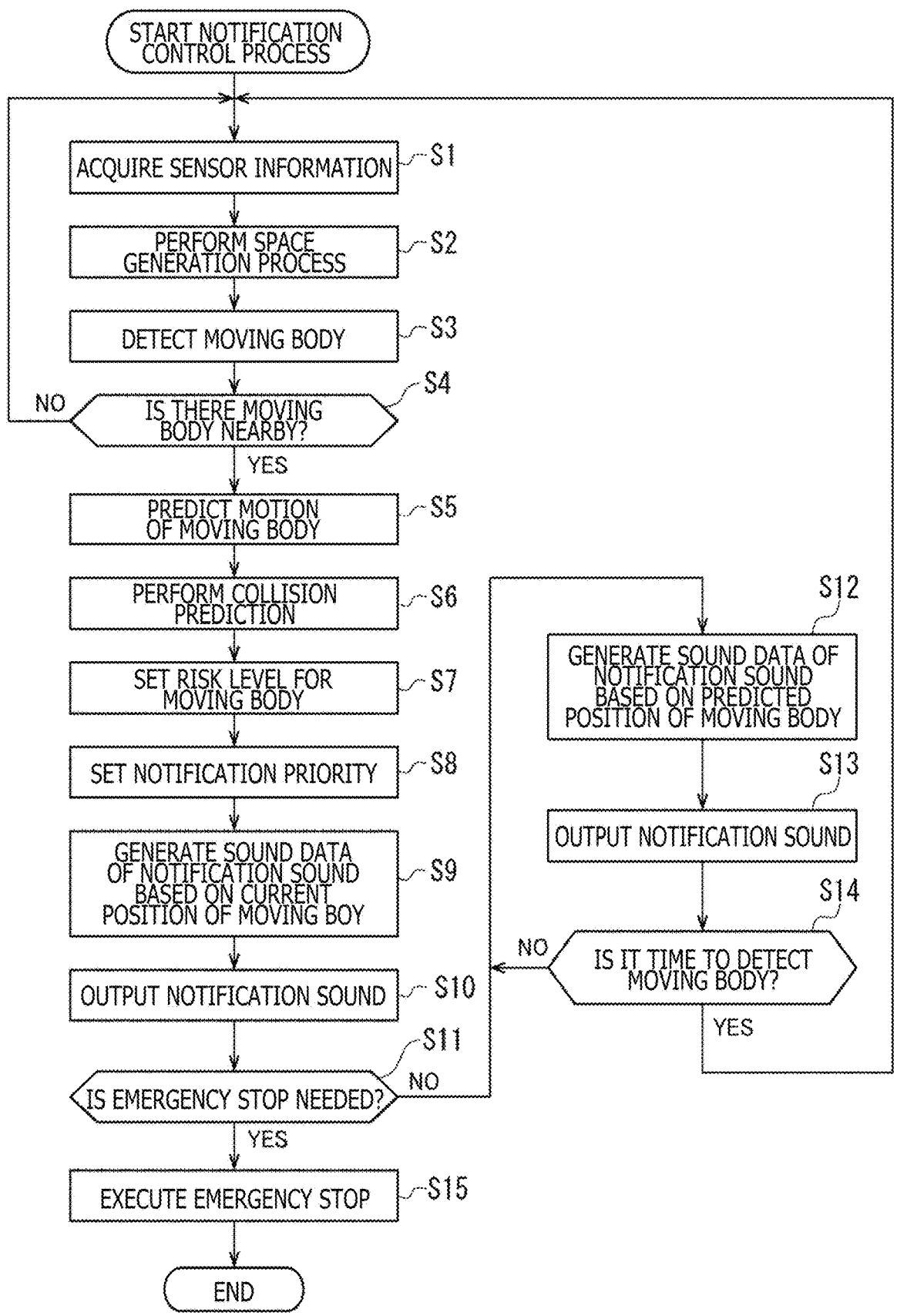
FIG. 3 is a flowchart for explaining a first embodiment of a notification control process.

Explained below with reference to the flowchart of FIG. 3 is a notification control process carried out by the onboard system 10. Note that the ensuing explanation will center on the process of giving notification by sound of the position of a moving body near the vehicle 101. The process of giving notification using an image or something other than sound will not be explained below.

This process is started, for example, when the vehicle 101 is activated and an operation to start driving is performed as when the ignition switch, the power switch, or the start switch of the vehicle 101 is turned on. The process is terminated, for example, when an operation to stop driving is performed such as the ignition switch, the power switch, or the start switch of the vehicle 101 being turned off.

In step S1, the information processing section 13 acquires the sensor information. Specifically, the peripheral status detection section 31 acquires the peripheral sensor data from the various peripheral sensors 11.

In step S2, the space generation section 41 performs a space generation process. That is, on the basis of the peripheral sensor data, the space generation section 41 generates (or updates) a three-dimensional space map indicative of the shapes and positions or the like of objects near the vehicle 101. Note that the objects near the vehicle 101 include not only moving bodies but also motionless objects (e.g., buildings and road surfaces). The space generation section 41 supplies the three-dimensional space map thus generated to the motion prediction section 32 and to the HMI control section 35.

Note that any appropriate method may be adopted in generating the three-dimensional space map. For example, the SLAM (Simultaneous Localization and Mapping) technique may be employed.

In step S3, the moving body detection section 42 performs moving body detection. Specifically, the moving body detection section 42 detects a moving body near the vehicle 101 based on the peripheral sensor data and on the three-dimensional space map. For example, the moving body detection section 42 detects the presence or absence of any moving body and the type, size, shape, and position of the detected moving body near the vehicle 101. The moving body detection section 42 supplies the result of the moving body detection to the motion prediction section 32 and to the HMI control section 35.

Note that any appropriate method may be adopted in detecting the moving body. The moving bodies targeted for detection include not only actually moving bodies but also temporarily motionless objects including stopped vehicles, bicycles, and pedestrians.

Moreover, the moving body detection section 42 may detect a moving body near the vehicle 101 based on the peripheral sensor data alone and without recourse to the three-dimensional space map, for example. In this case, steps S2 and S3 may be reversed during the process.

In step 4, the moving body detection section 42 determines whether or not there is a moving body nearby on the basis of the result of the processing in step S3. For example, in a case where no moving body is detected in the range of distance within a predetermined radius around the vehicle 101 (the distance will be referred to as the notification target distance and the range as the notification target range hereunder), the moving body detection section 42 determines that there is no moving body nearby. Control is then returned to step S1.

Thereafter, the processing of steps S1 to S4 is performed repeatedly until a moving body is determined to exist nearby.

On the other hand, in a case a moving body is detected in step S4 inside the notification target range, the moving body detection section 42 determines that there is a moving body nearby. Control is then transferred to step S5.

In step S5, the motion prediction section 32 predicts the motion of the moving body. Specifically, the motion prediction section 32 predicts the speed at which the moving body near the vehicle 101 moves and the direction in which that moving body moves on the basis of the result of detecting the moving body near the vehicle 101. The motion prediction section 32 supplies the result of the prediction to the collision prediction section 33, to the priority setting section 34, and to the HMI control section 35.

Note that any appropriate method may be adopted in performing motion prediction.

In step S6, the collision prediction section 33 performs collision prediction. Specifically, on the basis of the result of predicting the motion of the moving body near the vehicle 101, the collision prediction section 33 predicts whether or not the nearby moving body can contact or collide with the vehicle 101, and further predicts the time required for the nearby moving body to potentially contact or collide with the vehicle 101 (the time will be referred to as the predicted collision time hereunder).

In step S7, the collision prediction section 33 sets a risk level with respect to the moving body. For example, the collision prediction section 33 sets the risk level at one regarding a stopped moving body or a moving body moving away from the vehicle 101. On the other hand, the collision prediction section 33 sets the risk level at two regarding any of the moving bodies which is approaching the vehicle 101 and for which the predicted collision time exceeds time T1 second (e.g., five seconds). The collision prediction section 33 sets the risk level at three regarding any approaching moving body for which the predicted collision time is equal to or less than time T1 second and in excess of time T2 second (e.g., one second). The collision prediction section 33 sets the risk level at four regarding any approaching moving body for which the predicted collision time is equal to or less than time T2. The collision prediction section 33 supplies the result of the collision prediction including the risk level regarding each moving body to the priority setting section 34, to the HMI control section 35, and to the braking control section 16.

Note that one of the risk levels two to four may also be set for each of stopped moving bodies or of moving bodies moving away from the vehicle 101 on the basis of the predicted collision times.

Alternatively, the risk level may be set with respect to each moving body on the basis of the distance to the vehicle 101 instead of the predicted collision time. In this case, the closer the moving body is to the vehicle 101, the higher the risk level set for the moving body.

In step S8, the priority setting section 34 sets a notification priority. Specifically, in a case where multiple moving bodies are detected within the notification target range, the priority setting section 34 first selects one of the moving bodies as the notification target.

For example, the priority setting section 34 sets the moving body with the highest risk level as the notification target. Note that in a case where there are multiple moving bodies with the highest risk level, the moving body closest to the vehicle 101 is selected as the notification target, for example.

Alternatively, the priority setting section 34 selects the moving body with a predetermined or higher risk level as the notification target.

As another alternative, the priority setting section 34 selects a predetermined number of moving bodies with a high risk level as the notification target.

As a further alternative, the priority setting section 34 regards all moving bodies within the notification target range as the notification target without selecting any of the moving bodies as the notification target.

Next, the priority setting section 34 sets the priority for each of the moving bodies selected as the notification target (the moving body will be referred to as the notification target moving body hereunder).

For example, the priority setting section 34 sets the priorities of the notification target moving bodies in descending order of risk level. Note that in a case where multiple moving bodies have the same risk level, the moving bodies may be given the same priority. Alternatively, the closer a moving body is to the vehicle 101, the higher the priority given to that moving body.

As another alternative, the priority setting section 34 may give the same priority to all notification target moving bodies without setting their priorities.

Note that in a case where a single moving body is detected within the notification target range, the priority setting section 34 may select that moving body unconditionally as the notification target.

The priority setting section 34 supplies notification priority setting information to the HMI control section 35. The setting information includes information indicative of the notification target moving body. Where notification target moving bodies are individually given their priorities, information regarding the priorities is also included in the setting information.

In step S9, the sound output control section 52 generates the sound data of a notification sound on the basis of the current position of the moving body.

For example, based on the type of each notification target moving body, the sound output control section 52 sets the type of the notification sound for each notification target moving body. At this point, the notification sound is set in such a manner that the type of each notification target moving body is easily identified. For example, the notification sound with respect to an automobile is set for "Beep, beep" evoking the car horns of the automobile. The notification sound regarding a motorbike is set for "Vroom, vroom" evoking the sound of the motorbike engine. The notification sound with regard to a bicycle is set for "Jingle, jingle" evoking the bicycle bell. The notification sound with respect to a person is set for "Pit-a-pat, pit-a-pat" evoking a walking pedestrian's footsteps.

Note that in a case where there are multiple notification target moving bodies of the same type, the type of the notification sound is changed to identify each of the multiple notification target moving bodies. For example, the pattern, tone, and tempo of the notification sound are changed for each of the notification target moving bodies.

Also, the sound output control section 52 localizes the position of the sound image of the notification sound for each of the notification target moving bodies based on the current position of each notification target moving body. For example, the sound output control section 52 localizes the position of the sound image of the notification sound for each notification target moving body in the direction in which the notification target moving body exists in reference to a predetermined reference position. Note that The reference position may be established, for example, at the center of the vehicle 101 in the planar direction or at the position of the driver 102. Thus, the sound image of the notification sound for each notification target moving body is localized in the current direction (relative direction) of each notification target moving body with respect to the vehicle 101 (or to the driver 102).

Figure 4:
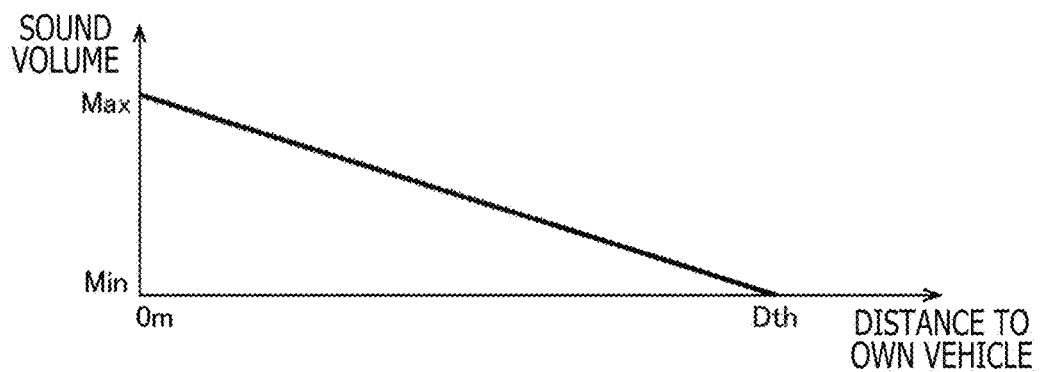
FIG. 4 is a graphic chart depicting a method of controlling volume of notification sound.

Furthermore, the sound output control section 52 adjusts, using the volume of the notification sound, the position of the sound image of the notification sound for each notification target moving body in terms of distance and direction. For example, as depicted in FIG. 4, the sound output control section 52 sets the volume of the notification sound for each notification target moving body in such a manner that the volume is maximum when the distance to the vehicle 101 is 0 m and is minimum when the notification target distance is Dth, the volume being decreased linearly in keeping with the distance to the vehicle 101 (own vehicle). Note that, the maximum volume may be either set constant to all notification target moving bodies or varied depending on the priority and type of the notification target moving body, for example.

The sound output control section 52 then generates the sound data to be supplied to each of the speakers 111 in such a manner that the notification sound for each notification target moving body is of the set sound type and that the sound image of the notification sound for each notification target moving body is localized at the set position. At this point, for example, where there are multiple notification target moving bodies in the same direction, the sound data is generated in such a manner that the notification sounds for the multiple notification target moving bodies are included in the sound output from a single speaker 111.

In step S10, the sound output section 15 outputs the notification sound. That is, the sound output control section 52 supplies the sound data generated in step S9 to each of the speakers 111 of the sound output section 15. Each speaker 111 outputs the sound based on the sound data. As a result, the notification sound for each notification target moving body is output in the form of the sound corresponding to the type of that notification target moving body. At the same time, the notification sound for each notification target moving body is localized at the position corresponding to the current position in terms of direction and distance of each notification target moving body relative to the vehicle 101 (or its driver 102).

Figure 5:
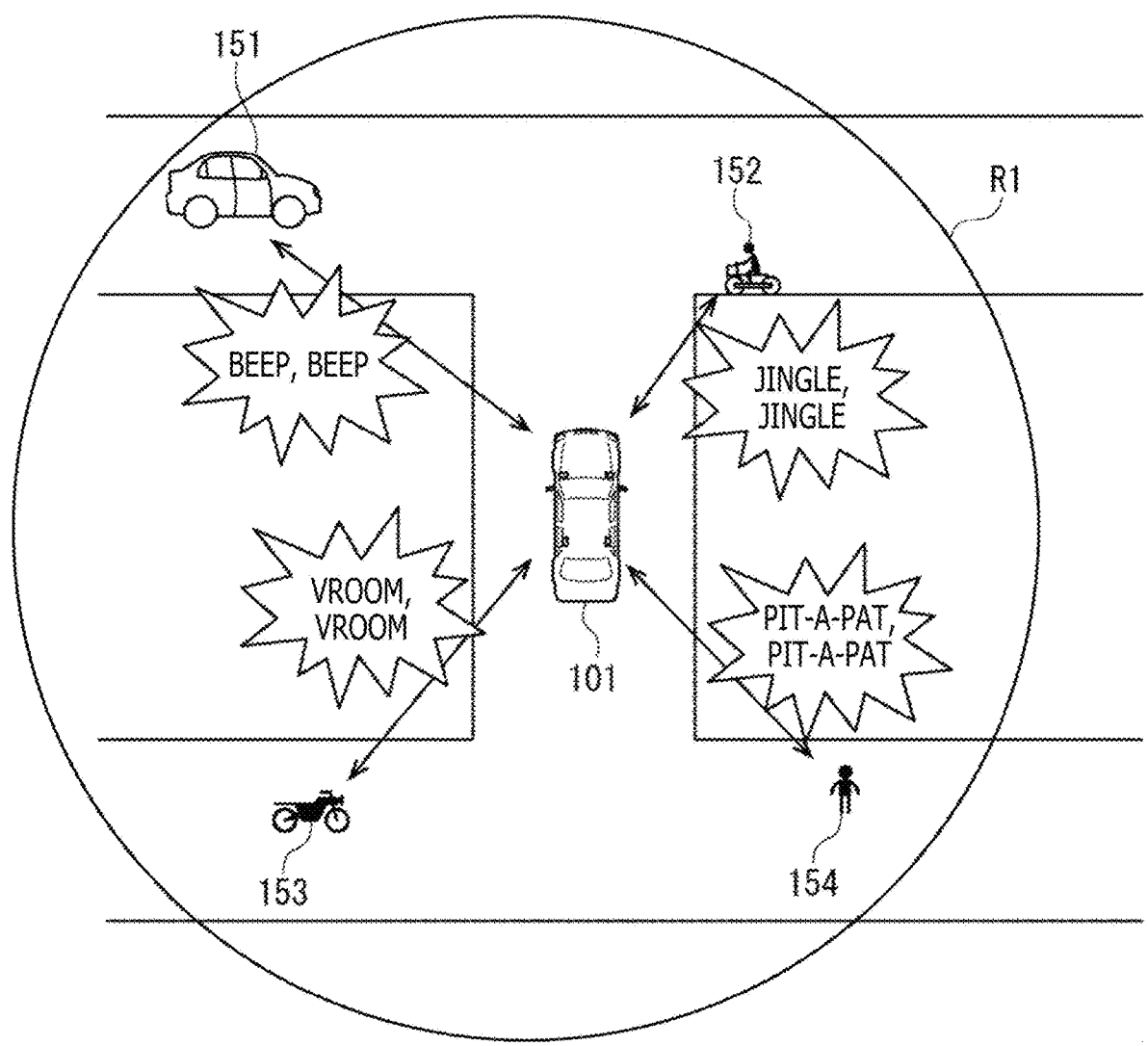
FIG. 5 is a schematic diagram depicting a first output example of the notification sound.

Consequently, as depicted in FIG. 5, for example, with respect to an automobile 151 at the front left of the vehicle 101 inside a notification target range R1, the notification sound is output in such a manner that a sound "Beep, beep" is heard in the direction of the automobile 151. With respect to a bicycle 152 at the front right of the vehicle 101 inside the notification target range R1, the notification sound is output in such a manner that a sound "Jingle, jingle" is heard in the direction of the bicycle 152. With respect to a motorbike 153 at the back left of the vehicle 101 inside the notification target range R1, the notification sound is output in such a manner that a sound "Vroom, vroom" is heard in the direction of the motorbike 153. With respect to a person 154 at the back right of the vehicle 101 within the notification target range R1, the notification sound is output in such a manner that a sound "Vroom, vroom" is heard in the direction of the person 154.

In the manner described above, the driver 102 is able to recognize easily the types and positions of the moving bodies near the vehicle 101.

Note that the sound output control section 52 may control the output of the notification sound in accordance with the priorities given to the notification target objects.

Figure 6:
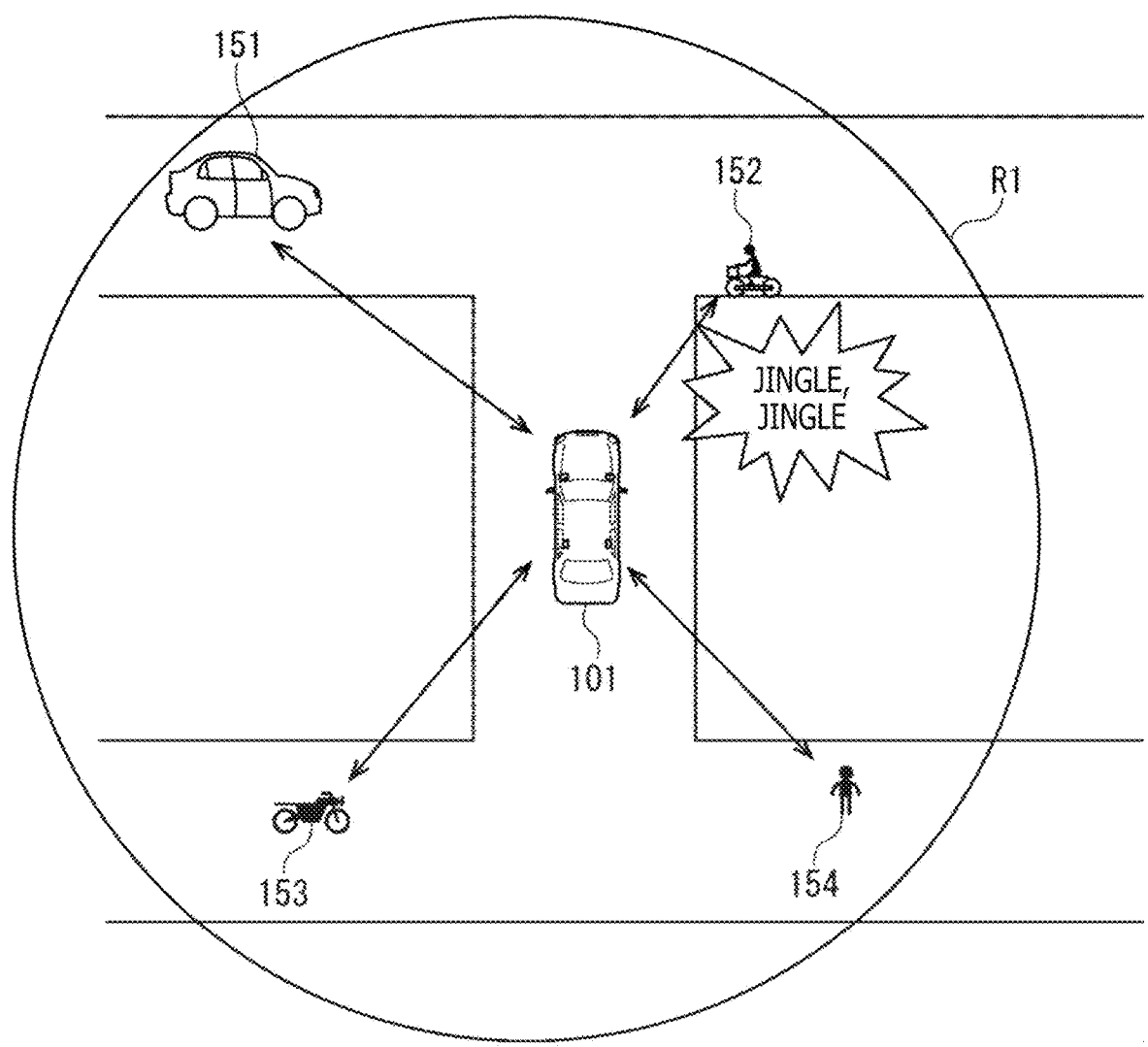
FIG. 6 is a schematic diagram depicting a second output example of the notification sound.

For example, the notification sound may be output preferentially for the notification target object with a high priority. As depicted in FIG. 6, the notification sound may be output only for the bicycle 152 with the highest priority, for instance.

Figure 7:
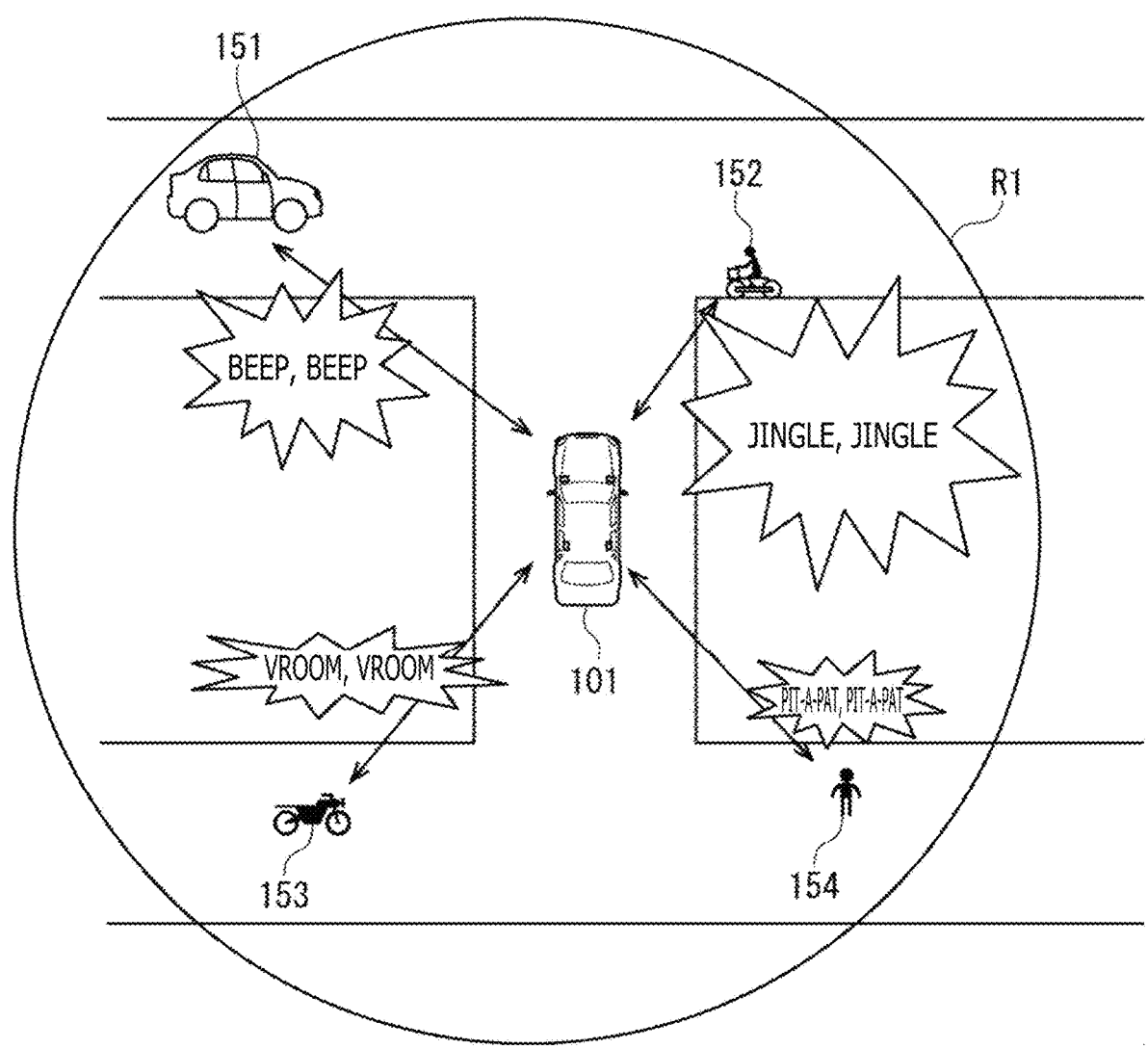
FIG. 7 is a schematic diagram depicting a third output example of the notification sound.

As another alternative, as depicted in FIG. 7, for example, the volume of the notification sound may be adjusted for each notification target object in accordance with priority. For instance, the volume of the notification sound for the bicycle 152 with the highest priority is set to be highest; the volume of the notification sound for the automobile 151 with the second highest priority is set to be the second highest; the volume of the notification sound for the motorbike 153 with the third highest priority is set to be the third highest; and the volume of the notification sound for the person 154 with the lowest priority is set to be lowest.

Note that it is to be noted that the notification sound of which the output is started in step S10 is continuously output in the same type and at the same localized position until a new notification sound is output in step S13, to be discussed later, or until the notification control process is terminated.

In step S11, the braking control section 16 determines whether or not an emergency stop is needed. For example, in a case where there is no moving body with the risk level 4 among the moving bodies near the vehicle 101, the braking control section 16 determines that there is no need for an emergency stop. Control is then transferred to step S12.

In step S12, the sound output control section 52 generates the sound data of the notification sound on the basis of the predicted position of the moving body. Specifically, based on the result of the prediction by the motion prediction section 32, the sound output control section 52 acquires the predicted position for each of the notification target moving bodies at the next timing of outputting the notification sound. Then, in a manner similar to that of step S9, the sound output control section 52 generates the sound data of the notification sound for each notification target moving body based on its predicted position instead of its current position.

Note that the output of the notification sound for any notification target moving body moving out of the notification target range may be either stopped or continued.

In step S13, the sound output section 15 outputs the notification sound. That is, the sound output control section 52 supplies the sound data generated in step S12 to each of the speakers 111 of the sound output section 15. In turn, each speaker 111 outputs the sound based on the supplied sound data.

Note that the notification sound of which the output is started in step S13 is continuously output in the same type and at the same localized position until a new notification sound is output in step S10 or S13 or until the notification control process is terminated.

In step S14, the moving body detection section 42 determines whether or not it is time to execute moving body detection. In a case where it is determined that it is not time to execute moving body detection, the processing is returned to step S12. The processing of steps S12 to S14 is then performed repeatedly until the moving body detection section 42 determines in step S14 that it is time to execute moving body detection.

For example, in a case where the moving body detection section 42 executes moving body detection based on the peripheral image data, the interval at which moving body detection is executed is equal to or less than the frame rate of the peripheral image data. Here, the reason why the detection interval is set to be equal to or less than the frame rate of the peripheral image data is because there may be a case where moving body detection is executed for each of multiple frames.

Thus, if the processing of steps S12 and S13 is not carried out, then the interval at which the localized position of the sound image of the notification sound is updated becomes equal to the interval at which moving body detection is executed, and becomes equal to or less than the frame rate of the peripheral image data. Even if the notification target moving body moves from the time the notification sound is output on the basis of the result of the current execution of moving body detection until the notification sound is output on the basis of the result of the next execution of moving body detection, the sound image of the notification sound remains unchanged in direction and in volume. Thus, as the notification target moving body moves, the sound image of the notification sound may abruptly change in direction or in volume, causing the driver 102 to feel uncomfortable or confused. It may also happen that there occurs a significant difference between the localized position of the sound image of the notification sound and the actual position of the notification target moving body.

On the other hand, when the processing of steps S12 and S13 is carried out, the localized position of the sound image of the notification sound is updated on the basis of the predicted position of the notification target moving body from the time the notification sound is output on the basis of the result of the current execution of moving body detection until the notification sound is output on the basis of the result of the next execution of moving body detection. That is, from the time the position of the sound image of the notification sound is set on the basis of the detected moving body position until the position of the sound image of the notification sound is set on the basis of the next detected position of the moving image, the position of the sound image of the notification sound is set on the basis of the predicted position of the moving body. This makes the interval at which to update the sound image of the notification sound in direction and in volume shorter than the interval at which to execute moving body detection. Consequently, as the notification target moving body moves, the sound image of the notification sound changes in direction and in volume more smoothly, which prevents the driver 102 from feeling uncomfortable or confused. Also, the difference is reduced between the localized position of the sound image of the notification sound and the actual position of the notification target moving body.

Figure 8:
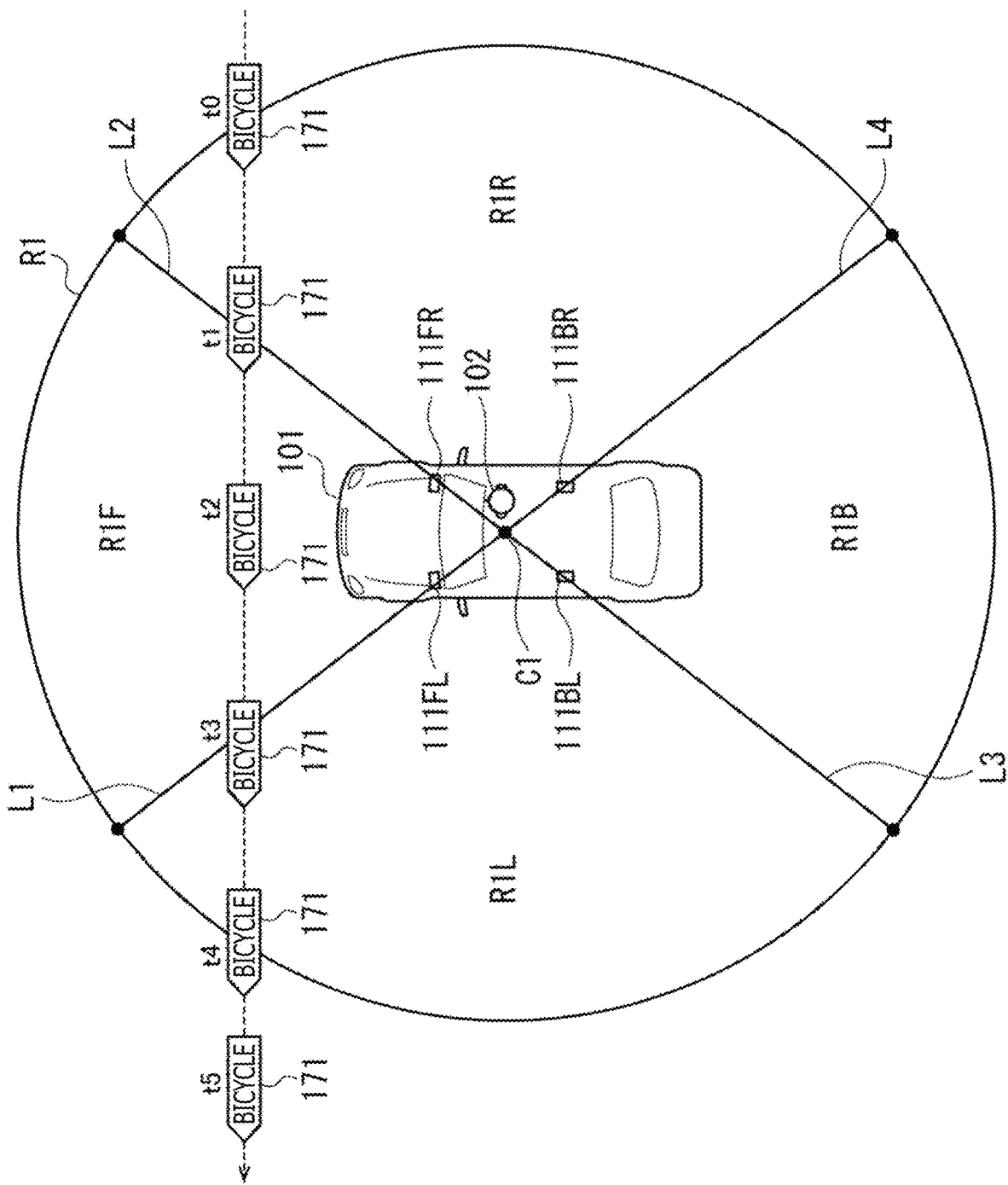
FIG. 8 is a schematic diagram depicting a first example of how a bicycle as a target of notification moves.

For example, as depicted in FIG. 8, consider a case where a bicycle 171 moves from right to left in front of the vehicle 101.

Note that the notification target range R1 is a circular region of which the center coincides with a center C1 of the vehicle 101 and of which the radius is equal to the notification target distance. Note that lines L1, L2, L3 and L4 extending from the center C1 in the directions of the speakers 111FL, 111FR, 111BL and 111BR, respectively, divide the notification target range R1 into four portions. The divided portions will be referred to as regions R1F, R1L, R1R, and R1B in the ensuing description. The region R1F is located in front of the vehicle 101; the region R1L is located to the left of the vehicle 101; the region R1R is located to the right of the vehicle 101; and the region R1B is located at the back of the vehicle 101.

Note that the notification sound regarding the notification target moving body in the region R1F is output from the speakers 111FL and 111FR. The notification sound regarding the notification target moving body in the region R1L is output from the speakers 111FL and 111BL. The notification sound regarding the notification target moving body in the region R1R is output from the speakers 111FR and 111BR. The notification sound regarding the notification target moving body in the region R1B is output from the speakers 111BL and 111BR.

In the example of FIG. 8, the bicycle 171 enters the region R1R of the notification target range R1 at time t0, moves from right to left in front of the vehicle 101, and exits from the notification target range R1 at time t4. Also, the bicycle 171 reaches the vicinity of the boundary between the regions R1R and R1F at time t1, reaches the vicinity of the front of the vehicle 101 at time t2, and reaches the vicinity of the boundary between the regions R1F and R1L at time t3.

Figure 9:
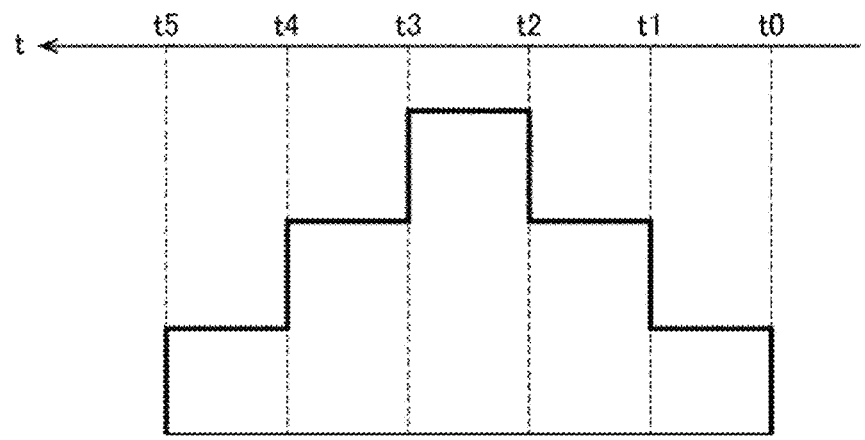
FIG. 9 is a schematic diagram depicting how the sound image of the notification sound is changed in direction and in volume in a case where a predicted position of the bicycle is not used.

FIG. 9 schematically depicts how the sound image of the notification sound is changed in direction and in volume in a case where the localized position of the sound image of the notification sound is updated relative to the bicycle 171 on the basis of solely the detected position of the bicycle 171. In FIG. 9, the horizontal axis denotes the direction of the sound image of the notification sound and the vertical axis represents the volume of the notification sound.

At time t0, the output of the notification sound is started. Thereafter, as time elapses and as the bicycle 171 moves leftward, the direction of the sound image of the notification sound shifts from right to left. The volume of the notification sound rises gradually from time t0 to time t2, is maximized during the period between time t2 and time t3, drops gradually from time t3 to time t5, and reaches 0 at time t5.

Figure 10:
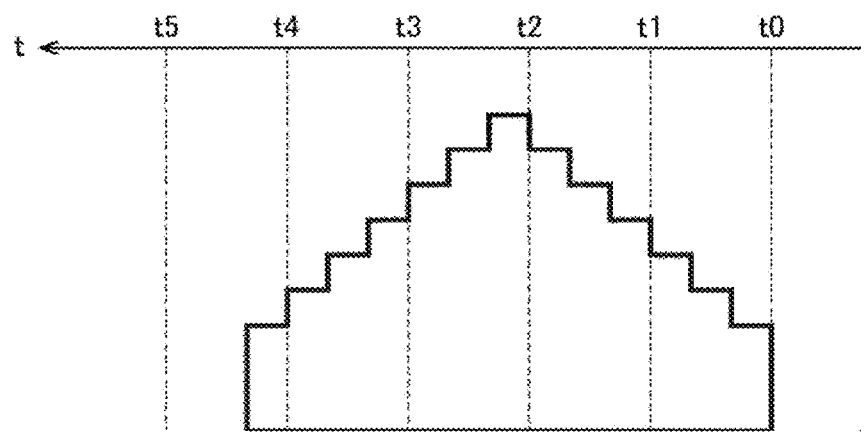
FIG. 10 is a schematic diagram depicting how the sound image of the notification sound is changed in direction and in volume in a case where the predicted position of the bicycle is used.

FIG. 10 schematically depicts how the sound image of the notification sound is changed in direction and in volume in the case where the localized position of the sound image of the notification sound is updated relative to the bicycle 171 on the basis of both the detected position and the predicted position of the bicycle 171. In FIG. 10, as in FIG. 9, the horizontal axis denotes the direction of the sound image of the notification sound and the vertical axis represents the volume of the notification sound.

In this example, the localized position of the notification sound is updated twice between two time points on the basis of the predicted position of the bicycle 171. At time t0, the output of the notification sound is started. As time elapses and as the bicycle 171 moves leftward, the direction of the sound image of the notification sound shifts from right to left. Furthermore, the volume of the notification sound rises gradually from time t0 to time t2, is maximized during the period between time t2 and the next timing of updating the localized position of the notification sound, drops gradually until time t4, and reaches zero at the next timing of updating the localized position of the notification sound following time t4.

Comparing the example of FIG. 10 with that of FIG. 9 reveals that the sound image of the notification sound is changed more smoothly in direction and in volume in the example of FIG. 10. Therefore, This prevents the driver 102 from feeling uncomfortable or confused.

Figure 11:
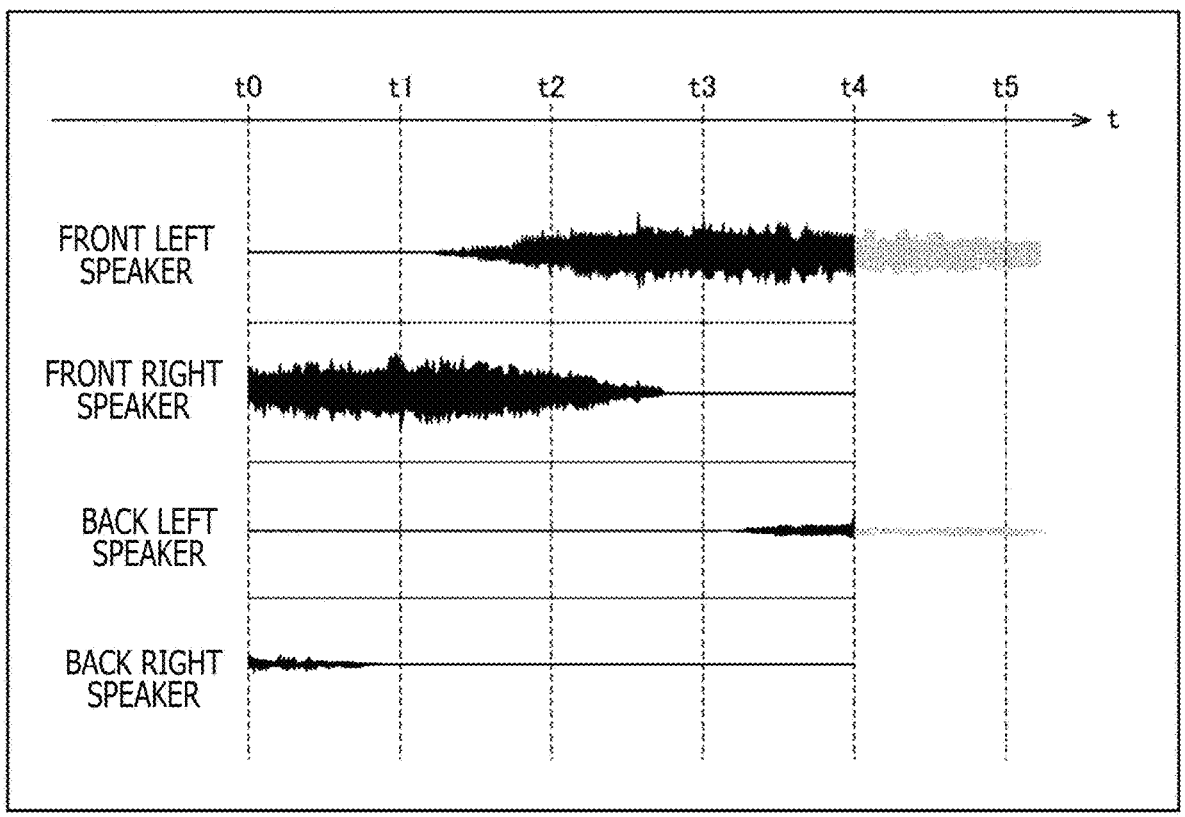
FIG. 11 is a graphic chart depicting exemplary waveforms of output sounds from speakers that output the notification sound regarding the bicycle in FIG. 8.

FIG. 11 illustrates detailed exemplary waveforms of output sounds from the speakers 111 in a case where the bicycle 171 moves as depicted in FIG. 8. In FIG. 11, the horizontal axis denotes time. The waveform at the top represents the waveform of the output sound from the front left speaker 111FL. The second waveform from the top represents the waveform of the output sound from the front right speaker 111FR. The third waveform from the top represents the waveform of the output sound from the back left speaker 111BL. The waveform at the bottom represents the waveform of the output sound from the back right speaker 111BR. Note that, in FIG. 11, the horizontal axis denotes time, and the amplitude of each waveform represents the volume of the output sound from each speaker 111.

From time t0 until time t1, the bicycle 171 is inside the region R1R. Thus, the notification sound with respect to the bicycle 171 is implemented by combining the output sound from the speaker 111FR with the output sound from the speaker 111BR. That is, the output sounds from the speakers 111FR and 111BR cause the sound image of the notification sound regarding the bicycle 171 to be localized in the direction of the bicycle 171 as viewed from the reference position (e.g., center of the vehicle 101 or its driver 102). Also, the output sounds from the speakers 111FR and 111BR are adjusted in volume in such a manner that the notification sound is raised in volume as the bicycle 171 approaches the reference position.

From time t1 until time t3, the bicycle 171 is inside the region R1F. Thus, the notification sound with respect to the bicycle 171 is implemented by combining the output sound from the speaker 111FL with the output sound from the speaker 111FR. That is, the output sounds from the speakers 111FL and 111FR cause the sound image of the notification sound regarding the bicycle 171 to be localized in the direction of the bicycle 171 as viewed from the reference position. Also, the output sounds from the speakers 111FL and 111FR are adjusted in volume in such a manner that the notification sound is raised in volume as the bicycle 171 approaches the reference position and lowered in volume as the bicycle 171 moves away from the reference position.

From time t3 until time t4, the bicycle 171 is inside the region R1L. Thus, the notification sound with respect to the bicycle 171 is implemented by combining the output sound from the speaker 111FL with the output sound from the speaker 111BL. That is, the output sounds from the speakers 111FL and 111BL cause the sound image of the notification sound regarding the bicycle 171 to be localized in the direction of the bicycle 171 as viewed from the reference position. Also, the output sounds from the speakers 111FL and 111BL are adjusted in volume in such a manner that the notification sound is lowered in volume as the bicycle 171 moves away from the reference position.

After time t4, the bicycle 171 is outside the notification target range R1. Thus, the notification sound with respect to the bicycle 171 is stopped.

Figure 12:
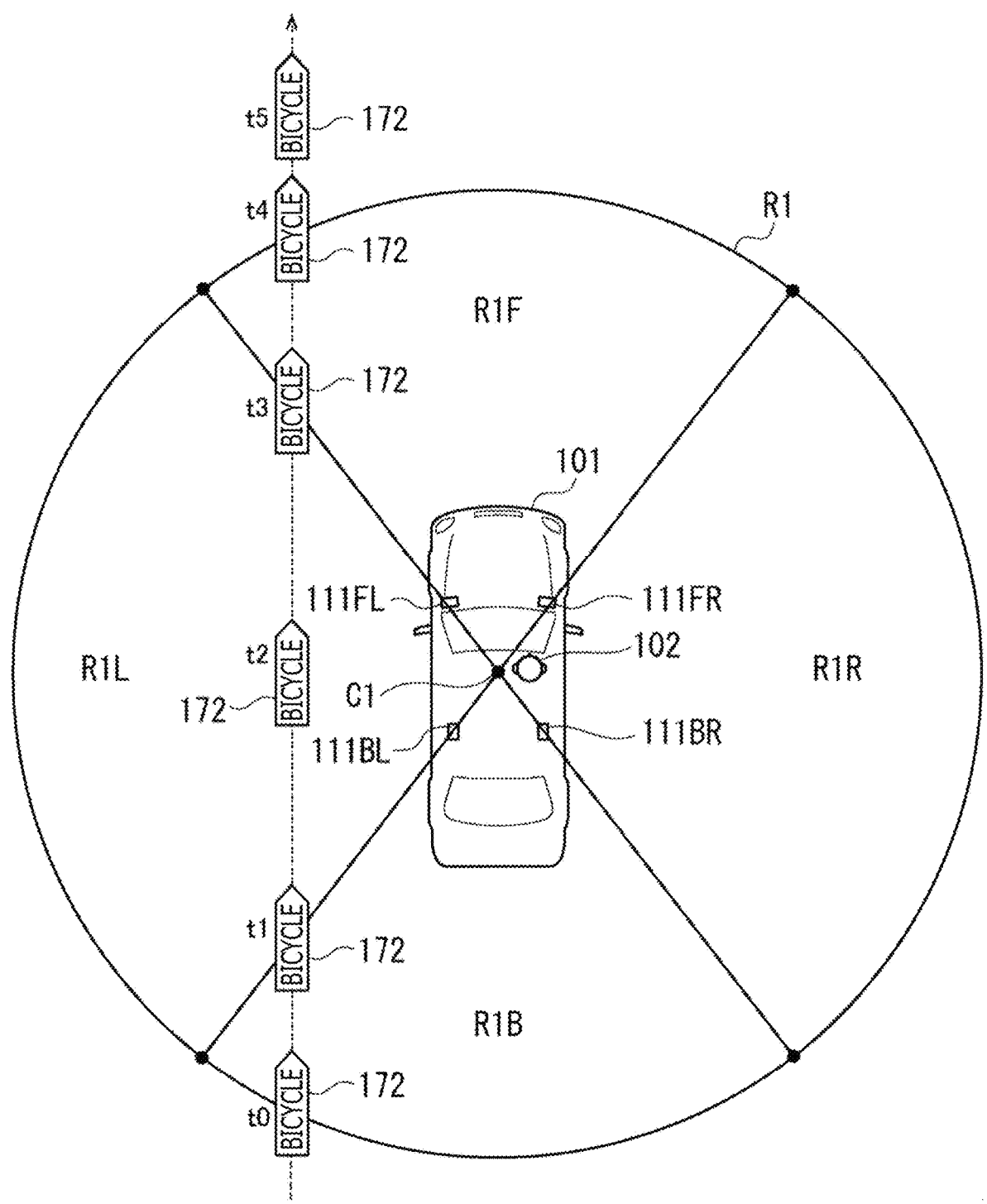
FIG. 12 is a schematic diagram depicting a second example of how a bicycle as the target of notification moves.
Figure 13:
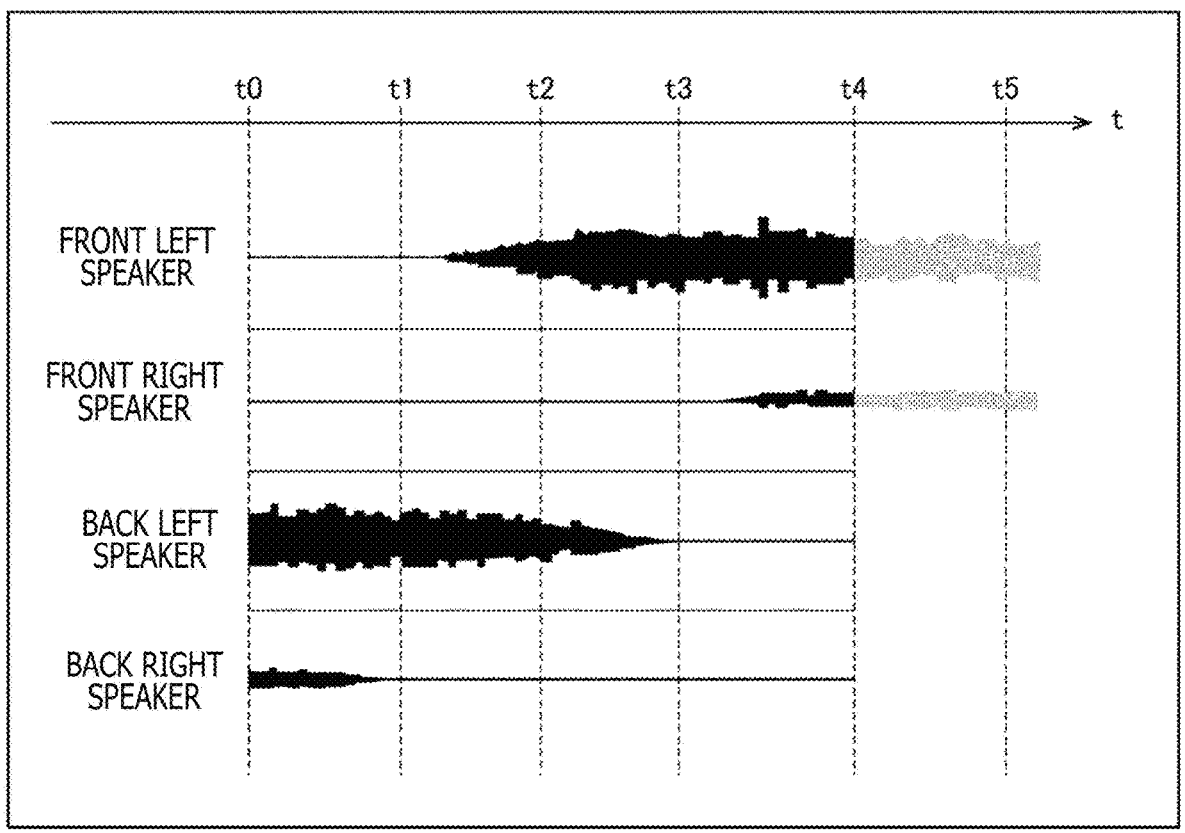
FIG. 13 is a graphic chart depicting exemplary waveforms of output sounds from speakers that output the notification sound regarding the bicycle in FIG. 12.

FIG. 13 illustrates detailed exemplary waveforms of output sounds from the speakers 111 in a case where a bicycle 172 moves as depicted in FIG. 12.

In the example of FIG. 12, the bicycle 172 enters the region R1B of the notification target range R1 from back left of the vehicle 101 at time t0, moves from back left to front of the vehicle 101, and exits from the notification target range R1 at time t4. Also, the bicycle 172 reaches the vicinity of the boundary between the regions R1B and R1L at time t1, reaches left of the vehicle 101 at time t2, and reaches the vicinity of the boundary between the regions R1L and R1F at time t3.

From time t0 until time t1, the bicycle 172 is inside the region R1B. Thus, the notification sound with respect to the bicycle 172 is implemented by combining the output sound from the speaker 111BL with the output sound from the speaker 111BR. That is, the output sounds from the speakers 111BL and 111BR cause the sound image of the notification sound regarding the bicycle 172 to be localized in the direction of the bicycle 172 as viewed from the reference position. Also, the output sounds from the speakers 111BL and 111BR are adjusted in volume in such a manner that the notification sound is raised in volume as the bicycle 172 approaches the reference position.

From time t1 until time t3, the bicycle 172 is inside the region R1L. Thus, the notification sound with respect to the bicycle 172 is implemented by combining the output sound from the speaker 111FL with the output sound from the speaker 111BL. That is, the output sounds from the speakers 111FL and 111BL cause the sound image of the notification sound regarding the bicycle 172 to be localized in the direction of the bicycle 172 as viewed from the reference position. Also, the output sounds from the speakers 111FL and 111BL are adjusted in volume in such a manner that the notification sound is raised in volume as the bicycle 172 approaches the reference position and lowered in volume as the bicycle 172 moves away from the reference position.

From time t3 until time t4, the bicycle 172 is inside the region R1F. Thus, the notification sound with respect to the bicycle 172 is implemented by combining the output sound from the speaker 111FL with the output sound from the speaker 111FR. That is, the output sounds from the speakers 111FL and 111FR cause the sound image of the notification sound regarding the bicycle 172 to be localized in the direction of the bicycle 172 as viewed from the reference position. Also, the output sounds from the speakers 111FL and 111FR are adjusted in volume in such a manner that the notification sound is lowered in volume as the bicycle 172 moves away from the reference position.

After time t4, the bicycle 172 is outside the notification target range R1. Thus, the notification sound with respect to the bicycle 172 is stopped.

Returning to FIG. 3, in a case where it is determined in step S14 that it is time to execute moving body detection, control is transferred back to step S1.

Thereafter, the processing of steps S1 to S14 is performed repeatedly until it is determined in step S11 that an emergency stop is needed.

Meanwhile, in a case where there is a moving body with the risk level 4 among the moving bodies near the vehicle 101 in step S11, for example, the braking control section 16 determines that an emergency stop is needed. The processing is then transferred to step S15.

In step S15, the braking control section 16 controls the braking device 17 to bring the vehicle 101 to an emergency stop. This prevents the vehicle 101 from collision or contact with the moving body nearby.

Thereafter, the notification control process is terminated.

In the manner described above, the notification sound is continuously output while the position of the sound image is being shifted in keeping with the moving body moving near the vehicle 101. Also, a different type of the notification sound is output for each different type of the moving body. This keeps the driver 102 accurately informed of the position and type of the moving body near the vehicle 101. As a result, for example, the driver 102 is able to detect risk quickly and unfailingly and avoid collision or contact with the nearby moving body.

1-5. Second Embodiment of Notification Control Process

Figure 14:
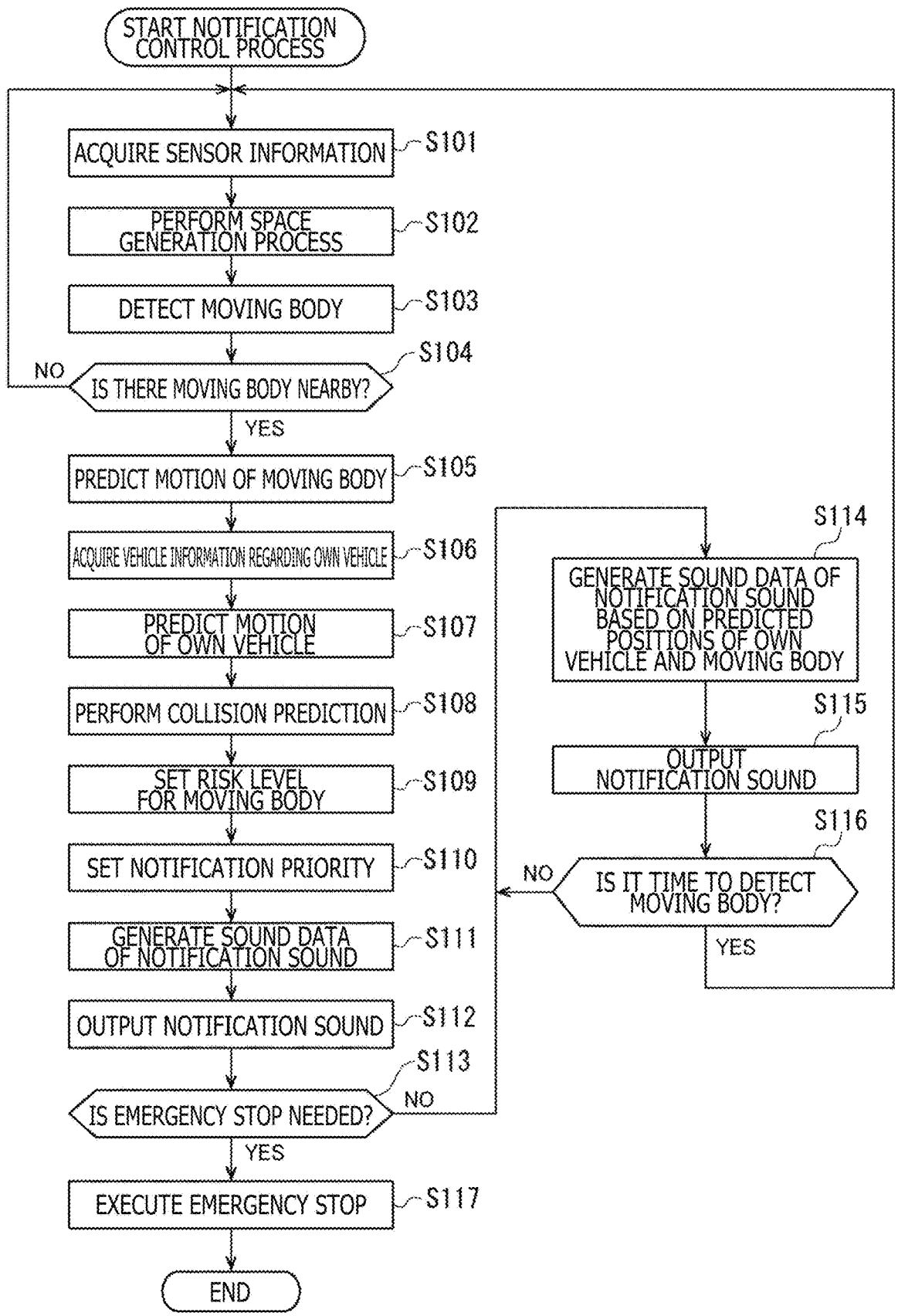
FIG. 14 is a flowchart for explaining a second embodiment of the notification control process.

A second embodiment of the notification control process is explained below with reference to the flowchart of FIG. 14.

The second embodiment of the notification control process differs from the first embodiment in that predictions are made not only of the motion of any moving body near the own vehicle but also of the motion of the own vehicle and that a collision prediction is performed on the basis of the result of predicting the motions of the own vehicle and of the moving body nearby.

In steps S101 to S105, the processing similar to that of steps S1 to S5 in FIG. 3 is carried out.

In step S106, the motion prediction section 32 acquires the vehicle information regarding the own vehicle (vehicle 101) from the vehicle information acquisition section 12.

In step S107, the motion prediction section 32 predicts the motion of the own vehicle. Specifically, the motion prediction section 32 predicts the speed at which the vehicle 101 is moving and the direction in which the vehicle 101 is moving on the basis of the vehicle information. The motion prediction section 32 supplies the result of the prediction to the collision prediction section 33, to the priority setting section 34, and to the HMI control section 35.

In step S108, the collision prediction section 33 performs collision prediction. Specifically, based on the result of predicting the motion of the vehicle 101 and that of the moving body nearby, the collision prediction section 33 determines whether or not there is a possibility of the nearby moving body colliding with or contacting the vehicle 101. Also based on the result of the prediction, the collision prediction section 33 acquires a predicted collision time of the moving body that can come into collision or contact with the vehicle 101.

In step S109, as in step S7 of FIG. 3, the risk level is set for the moving body.

In step S110, as in step S7 of FIG. 3, the notification priority is set. At this point, for example, the notification priority may be set in consideration of the result of the motion prediction regarding the vehicle 101. The notification priority may be set to be high for a moving body that is in the advancing direction of the vehicle 101 for instance.

Thereafter, the processing of steps S111 to S113 is carried out in a manner similar to that of steps S9 to S11 in FIG. 3.

In step S114, the sound output control section 52 generates the sound data of the notification sound on the basis of the predicted positions of the own vehicle and of the moving body. Specifically, based on the result of the prediction by the motion prediction section 32, the sound output control section 52 acquires the predicted position of the vehicle 101 and that of each notification target moving body at the next timing of outputting the notification sound. Then, as in step S111, the sound output control section 52 generates the sound data of the notification sound for each notification target moving body based on the predicted relative position of each notification target object with respect to the vehicle 101 instead of on the basis of the current position of each notification target moving body.

Thereafter, the processing of steps S115 to S117 is carried out in a manner similar to that of steps S13 to S15 in FIG. 3.

As described above, collision predictions are performed and the notification priority is set on the basis of not only the motion of the moving body but also on the motion of the vehicle 101. That means, for example, that notification is made regarding any moving body that is more likely than others to contact or collide with the vehicle. It is possible to localize the sound image of the notification sound at a position closer to each notification target object than ever, because the relative position of each notification target object with respect to the vehicle 101 is predicted and the localized position of the sound image of the notification sound is set on the basis of the result of the prediction.

2. VARIATIONS

Variations of the above-described embodiments of the present disclosure are explained below.

2-1. Variations of Number and Arrangement of Speakers

The number and the arrangement of the speakers 111 are not limited to those in the example of FIG. 2 and may be varied.

For example, in a case where notification is made regarding the moving bodies in all horizontal directions around the own vehicle, the speakers are only required to be arranged in such a manner that the driver is located inside a space with cameras positioned at its vertexes. Thus, that means a minimum of three speakers need only be installed.

As another alternative, in a case where a moving body solely in a particular direction such as in front of the own vehicle is set to be the notification target, it is possible to install only two speakers.

Figure 15:
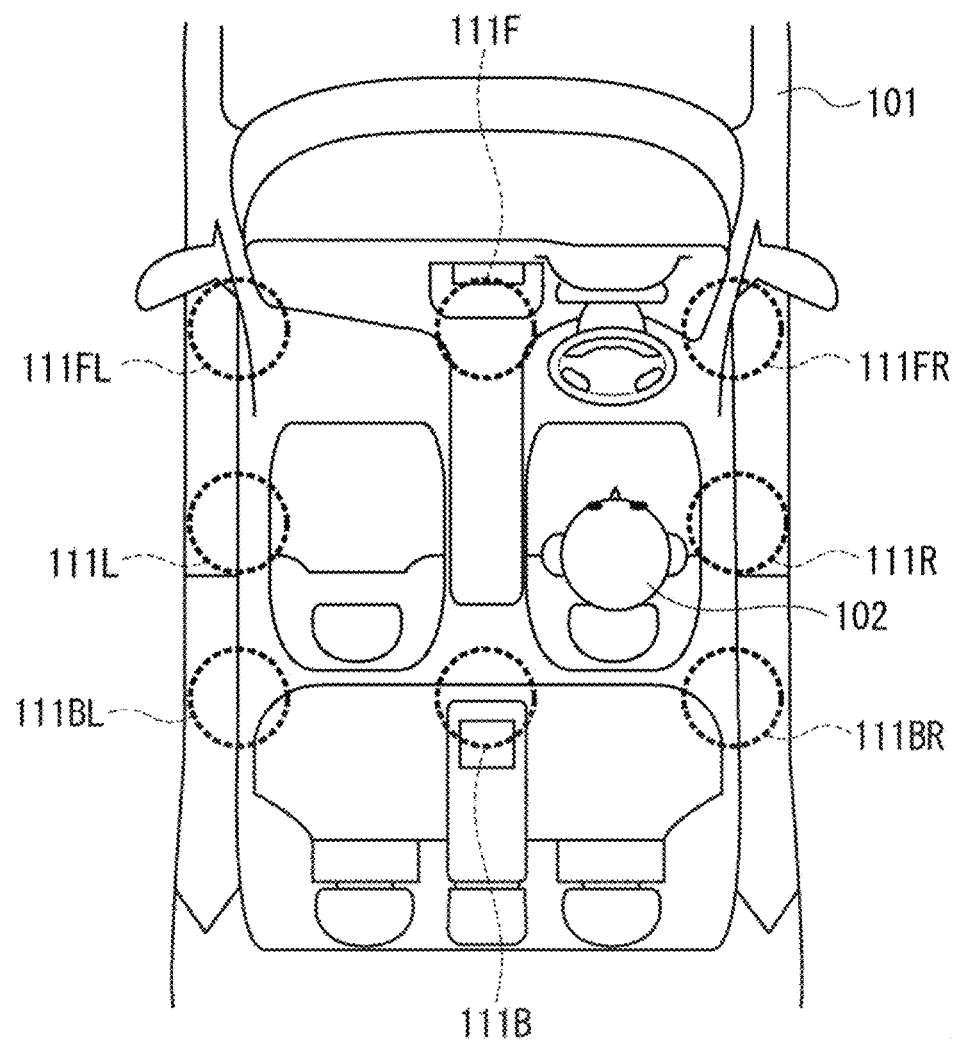
FIG. 15 is a schematic diagram depicting a second example of the speaker installation positions.

Still, the more directions in which the speakers are arranged, the more reliably the driver is able to recognize the positions of moving bodies. For example, as depicted in FIG. 15, eight speakers 111 may be arranged in a manner surrounding the driver 102. Note that, in FIG. 15, the parts corresponding to those in FIG. 2 are designated by like reference characters.

Compared with the example in FIG. 2, the example in FIG. 15 is characterized by speakers 111F, 111L, 111R and 111B being added. The speaker 111F is approximately in the middle between the speakers 111FL and 111FR and arranged near the center of the dashboard of the vehicle 101. The speaker 111L is approximately in the middle between the speakers 111FL and 111BL and arranged near the rear end of the front passenger seat door of the vehicle 101. The speaker 111R is approximately in the middle between the speakers 111FR and 111BR and arranged near the rear end of the driver seat door of the vehicle 101. The speaker 111B is approximately in the middle between the speakers 111BL and 111BR and arranged near the center of the backseat. The speakers 111F and 111B are arranged opposite to each other, and so are the speakers 111L and 11R opposite to each other.

As another alternative, the sound output control section 52 may control not only the horizontal position of the sound image of the notification sound but also the vertical position (in up-down direction) thereof with respect to the own vehicle (or its driver). The control makes it possible to give notification of the up-down-direction position of the moving body in reference to a plane (e.g., the road surface) on which the own vehicle (or its driver) exists.

Here, the up-down-direction position of the moving body in reference to the plane on which the own vehicle exists is the position of the moving body in the vertical direction relative to the road surface on which the own vehicle exists. For example, in a case where the own vehicle is moving on an uphill road, a preceding vehicle moving on the same uphill road is positioned at a higher altitude than the own vehicle but is considered to be approximately in the same vertical position in reference to the plane on which the own vehicle exists. Meanwhile, there may be a case where the own vehicle is moving on an even road while a preceding moving body is on an uphill road ahead. In that case, the moving body is positioned at a higher altitude relative to the plane on which the own vehicle exists.

Thus, in the example where the own vehicle is moving on the even road while the preceding moving body is on the uphill road ahead, the sound image of the notification sound regarding that moving body is localized in an upward direction. In another example where the own vehicle is moving on an even road while a preceding moving body is on a downhill road ahead, the sound image of the notification sound regarding that moving body is localized in a downward direction.

Figure 16:
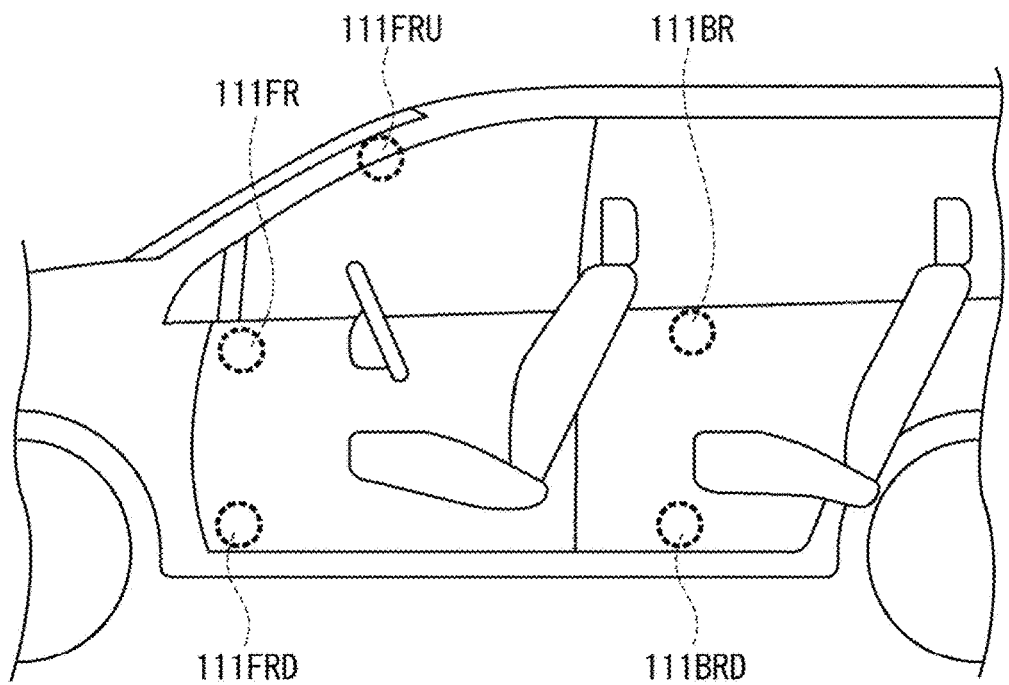
FIG. 16 is a schematic diagram depicting a third example of the speaker installation positions.

In these cases, multiple speakers 111 may be arranged at different heights as depicted in FIG. 16. Note that FIG. 16 is a perspective diagram schematically illustrating the interior of the vehicle 101 as viewed from the left side. In FIG. 16, the parts corresponding to those in FIG. 2 are designated by like reference characters.

Compared with the example in FIG. 2, the example in FIG. 16 is characterized by a speaker 111FLU (not depicted), a speaker 111FRU, a speaker 111FLD (not depicted), a speaker 111FRD, a speaker 111BLD (not depicted), and a speaker 111BRD being added.

The speaker 111FRU is at a higher position than the speaker 111FR and arranged near the top right end of the windshield of the vehicle 101. The speaker 111FRD is positioned under the speaker 111FR and arranged near the bottom end of the driver seat door. The speaker 111BRD is positioned under the speaker 111BR and arranged near the bottom end of the right backseat door. Note that, although not depicted, the speakers 111FLU, 111FLD and 111BLD on the left side of the interior of the vehicle 101 are arranged at positions approximately opposite to those of the speakers 111FRU, 111FRD and 111BRD, respectively. The speakers 111FLU, 111FRU, 111FLD, 111FRD, 111BLD, and 111BRD are all installed in a manner facing the interior of the vehicle 101.

For example, the output sounds from the speakers 111FRU and 111FR can localize the sound image of the notification sound at a position higher than the vehicle 101 (or its driver 102). In another example, the output sounds from the speakers 111FRU and 111FR can localize the sound image of the notification sound at a position lower than the vehicle 101 (or its driver 102).

Examples were described above in which the output sounds from two speakers are used to control the position of the sound image of a single notification sound. Alternatively, the position of the sound image may be controlled using the output sounds from three or more speakers.

2-2. Variations of System Configuration

The configuration of the onboard system 10 in FIG. 1 is only an example and may be varied as needed.

For example, the information processing section 13 may be divided into multiple sections; part of the information processing section 13 may be combined with the braking control section 16; and the braking control section 16 may be included in the information processing section 13.

In another example, part of the peripheral sensor data may be acquired from sensors outside the own vehicle (e.g., sensors installed along the driveway).

2-3. Other Variations

Examples were described above in which the notification target range is set on the basis of the distance from the vehicle 101. Alternatively, the notification target range may be set on the basis of the predicted collision time. That is, of the moving bodies near the vehicle 101, those whose predicted collision times fall within a predetermined time period may be set as the notification target.

As another alternative, the type of the notification sound may be varied not only on the basis of the type of the moving body but also in accordance with priority or risk level.

As a further alternative, the type of the notification sound may be set by the user.

2-4. Examples of Application

The present technology may be applied to mobile objects other than the vehicle discussed above. For example, the technology may be applied to such mobile objects as motorcycles, bicycles, personal mobility devices, aircraft, drones, ships, robots, construction machines, and farm machines (tractors).

3. OTHERS

3-1. Configuration Example of Computer

The series of the processes described above may be executed either by hardware or by software. Where the series of the processes is to be carried out by software, the programs constituting the software are installed into a suitable computer. Variations of the computer include one with the software installed beforehand in its dedicated hardware and a general-purpose personal computer or like equipment capable of executing diverse functions based on the programs installed therein.

Figure 17:
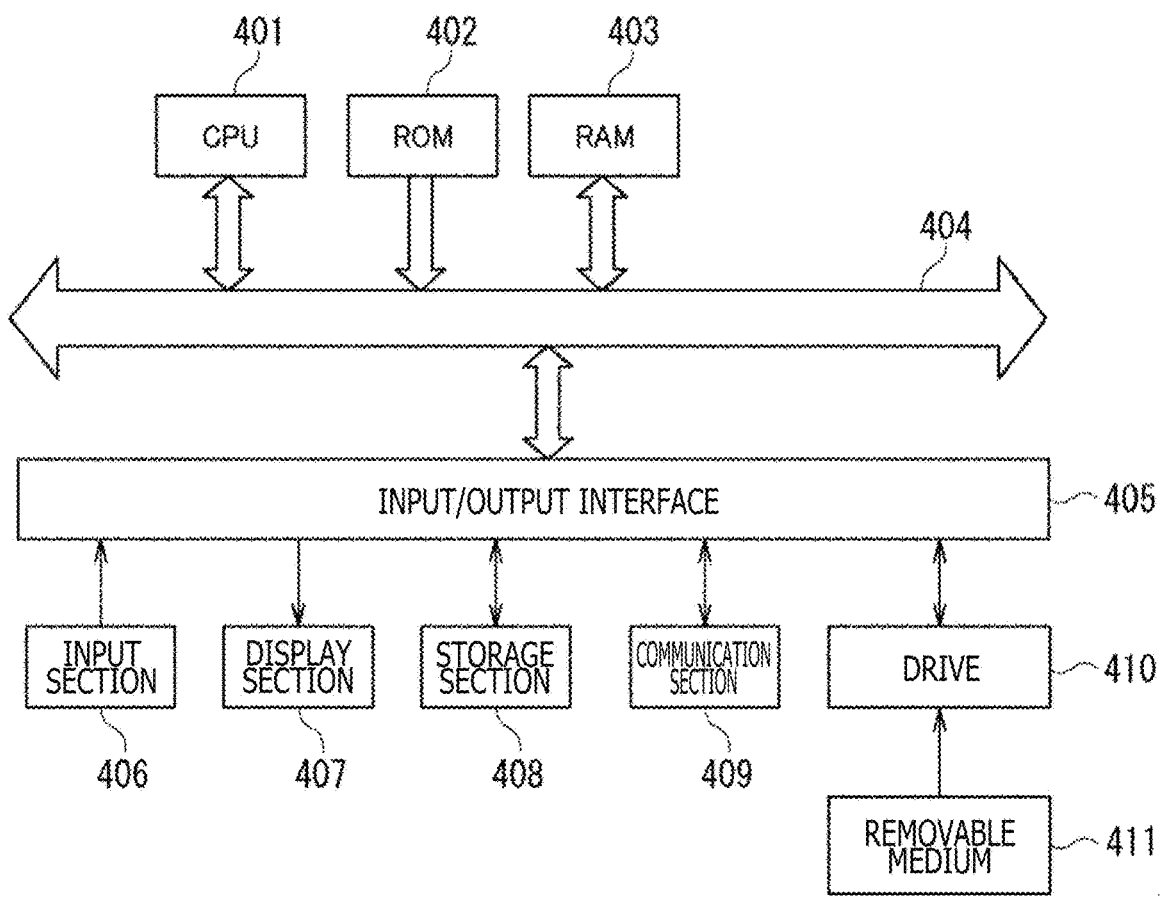
FIG. 17 is a schematic diagram depicting a configuration example of a computer.

FIG. 17 is a block diagram depicting a typical hardware configuration of a computer that executes the above-described series of the processes using programs.

In the computer, a CPU (Central Processing Unit) 401, a ROM (Read Only Memory) 402, and a RAM (Random Access Memory) 403 are interconnected via a bus 404.

The bus 404 is further connected with an input/output interface 405. The input/output interface 405 is connected with an input section 406, an output section 407, a recording section 408, a communication section 409, and a drive 410.

The input section 406 includes input switches, buttons, a microphone, and imaging elements, for example. The output section 407 includes a display unit and speakers, for example. The recoding section 408 is typically formed by a hard disk or a nonvolatile memory. The communication section 409 includes a network interface, for example. The drive 410 drives a removable recording medium 411 such as a magnetic disk, an optical disk, a magneto-optical disk, or a semiconductor memory.

In the computer configured as described above, the CPU 401 performs the above-described series of the processes by loading appropriate programs from, for example, the recording section 408 into the RAM 403 via the input/output interface 405 and the bus 404 and by executing the loaded programs.

The programs to be executed by the computer (CPU 401) may be recorded on the removable recording medium 411 such as packaged media when offered. The programs may also be offered via wired or wireless transmission medium such as local area networks, the Internet, and digital satellite broadcasting.

In the computer, the programs may be installed into the recording section 408 from the removable recording medium 411 attached to the drive 410 via the input/output interface 405. The programs may also be installed into the recording section 408 after being received by the communication section 409 via wired or wireless transmission medium. The programs may alternatively be preinstalled in the ROM 402 or in the recording section 408.

Note that each program to be executed by the computer may be processed chronologically, i.e., in the sequence depicted in this description; in parallel with other programs, or in otherwise appropriately timed fashion such as when it is invoked as needed.

In this description, the term "system" refers to an aggregate of multiple components (e.g., apparatuses or modules (parts)). It does not matter whether or not all components are housed in the same enclosure. Thus, a system may be configured with multiple apparatuses housed in separate enclosures and interconnected via a network, or with a single apparatus that houses multiple modules in a single enclosure.

Furthermore, the present technology is not limited to the embodiments discussed above and may be implemented in diverse variations so far as they are within the spirit and scope of this technology.

For example, the present technology may be implemented as a cloud computing setup in which a single function is processed cooperatively by multiple networked apparatuses on a shared basis.

Also, each of the steps discussed in reference to the above-described flowcharts may be executed either by a single apparatus or by multiple apparatuses on a shared basis.

Moreover, in a case where a single step includes multiple processes, these processes may be executed either by a single apparatus or by multiple apparatuses on a shared basis.

3-2. Examples of Combined Configurations

The present disclosure may be implemented preferably in the following configurations:

(1)

An information processing apparatus including:
a moving body detection section configured to detect a moving body near a mobile object on the basis of information input from sensors; and
a sound output control section configured to shift a position of a sound image of a notification sound giving notification of the position of the moving body in keeping with the detected position of the moving body in motion.

(2)

The information processing apparatus according to (1) above, further including:
a motion prediction section configured to predict the motion of the moving body, in which
the sound output control section shifts the position of the sound image of the notification sound on the basis of a predicted position of the moving body.

(3)

The information processing apparatus according to (2) above in which,
from the time the position of the sound image of the notification sound is set on the basis of a first detected position of the moving body until the position of the sound image of the notification sound is set on the basis of a second detected position of the moving body subsequent to the first detected position, the sound output control section sets the position of the sound image of the notification sound in accordance with the predicted position of the moving body.

(4)

The information processing apparatus according to (2) or (3) above, in which
the motion prediction section further predicts the motion of the mobile object, and
the sound output control section shifts the position of the sound image of the notification sound on the basis of the predicted position of the moving body relative to the predicted position of the mobile object.

(5)

The information processing apparatus as stated in any one of paragraphs (1) to (4) above, in which
the sound output control section controls the volume of the notification sound on the basis of a distance between the mobile object and the moving body.

(6)

The information processing apparatus as stated in any one of paragraphs (1) to (5) above, in which
the sound output control section changes a type of the notification sound depending on the type of the moving body.

(7)

The information processing apparatus according to (6) above, in which
in the case where there are multiple moving bodies of the same type near the mobile object, the sound output control section changes the type of the notification second for each of the moving bodies.

(8)

The information processing apparatus as stated in any one of paragraphs (1) to (7) above, further including:
a priority setting section configured to set a priority for the moving body, in which
the sound output control section controls the output of the notification sound regarding each of multiple moving bodies on the basis of the priority thereof.

(9)

The information processing apparatus according to (8) above, in which
the sound output control section performs control to preferentially output the notification sound regarding the moving body having a high priority.

(10)

The information processing apparatus according to (8) or (9) above, in which
the sound output control section controls the volume of the notification sound on the basis of the priority.

(11)

The information processing apparatus as stated in any one of paragraphs (8) to (10) above, in which
the priority setting section sets the priority for each moving body on the basis of a risk level at which the moving body can contact or collide with the mobile object.

(12)

The information processing apparatus as stated in any one of paragraphs (1) to (11) above, in which
the sound output control section performs control to output the notification sound regarding the moving body that comes into a predetermined range of vicinity of the mobile object.

(13)

The information processing apparatus as stated in any one of paragraphs (1) to (12) above, in which
the sound output control section controls an up-down-direction position of the sound image of the notification sound on the basis of the up-down-direction position of the moving body in reference to a plane on which the moving body exists.

(14)

The information processing apparatus according to (13) above, in which
the sound output control section controls the up-down-direction position of the sound image of the notification sound by controlling the output of sounds from multiple speakers arranged at different heights in the mobile object.

(15)

The information processing apparatus as stated in any one of paragraphs (1) to (14) above, in which
the sound output control section controls the output of sounds from multiple speakers arranged in the mobile object in a manner surrounding a driver of the mobile object.

(16)

The information processing apparatus as stated in any one of paragraphs (1) to (15) above, in which
the sound output control section shifts the position of the sound image of the notification sound in keeping with the detected position of the moving body in motion relative to the mobile object.

(17)
An information processing method including:
a moving body detection step for detecting a moving body near a mobile object on the basis of information input from sensors; and
a sound output control step for shifting the position of a sound image of a notification sound giving notification of a position of the moving body in keeping with a detected position of the moving body in motion.

(18)
A program for causing a computer to execute a process including:
a moving body detection step for detecting a moving body near a mobile object on the basis of information input from sensors; and
a sound output control step for shifting a position of a sound image of a notification sound giving notification of the position of the moving body in keeping with the detected position of the moving body in motion.

(19)
A mobile object including:
sensors configured to be arranged in a mobile object to detect peripheral status thereof;
a moving body detection section configured to detect a moving body nearby on the basis of information input from the sensors; and
a sound output control section configured to shift the position of a sound image of a notification sound giving notification of a position of the moving body in keeping with a detected position of the moving body in motion.

REFERENCE SIGNS LIST

10 Onboard system, 11 Peripheral sensors, 12 Vehicle information acquisition section, 13 Information processing section, 15 Sound output section, 31 Peripheral status detection section, 32 Motion prediction section, 33 Collision prediction section, 34 Priority setting section, 35 HMI control section, 42 Moving body detection section, 52 Sound output control section, 101 Vehicle, 102 Driver, 111F to 111BRD Speakers

The invention claimed is:

1. An information processing apparatus comprising:
a moving body detection section configured to detect a moving body near a mobile object on a basis of information input from sensors; and
a sound output control section configured to shift a position of a sound image of a notification sound giving notification of a position of the moving body in keeping with a detected position of the moving body in motion,
wherein the sound output control section performs control to determine whether the moving body has a set priority of highest priority or of a priority lower than the highest priority, and if the set priority is the highest priority, output the notification sound, and if the set priority is the priority lower than the highest priority, not output the notification sound.

2. The information processing apparatus according to claim 1, further comprising:
a motion prediction section configured to predict motion of the moving body, wherein the sound output control section shifts the position of the sound image of the notification sound on a basis of a predicted position of the moving body.

3. The information processing apparatus according to claim 2, wherein,
from a time the position of the sound image of the notification sound is set on a basis of a first detected position of the moving body until the position of the sound image of the notification sound is set on a basis of a second detected position of the moving body subsequent to the first detected position, the sound output control section sets the position of the sound image of the notification sound in accordance with the predicted position of the moving body.

4. The information processing apparatus according to claim 2, wherein
the motion prediction section further predicts the motion of the mobile object, and
the sound output control section shifts the position of the sound image of the notification sound on a basis of the predicted position of the moving body relative to the predicted position of the mobile object.

5. The information processing apparatus according to claim 1, wherein
the sound output control section controls volume of the notification sound on a basis of a distance between the mobile object and the moving body.

6. The information processing apparatus according to claim 1, wherein
the sound output control section changes a type of the notification sound depending on a type of the moving body.

7. The information processing apparatus according to claim 6, wherein
in a case where there are a plurality of moving bodies of the same type near the mobile object, the sound output control section changes the type of the notification sound for each of the moving bodies.

8. The information processing apparatus according to claim 1, further comprising:
a priority setting section configured to set the priority for the moving body, wherein the sound output control section controls the output of the notification sound regarding each of a plurality of moving bodies on a basis of the priority thereof.

9. The information processing apparatus according to claim 8, wherein
the sound output control section performs control to preferentially output the notification sound regarding the moving body having a high priority.

10. The information processing apparatus according to claim 8, wherein
the sound output control section controls the volume of the notification sound on a basis of the priority.

11. The information processing apparatus according to claim 8, wherein
the priority setting section sets the priority for each moving body on a basis of a risk level at which the moving body can contact or collide with the mobile object.

12. The information processing apparatus according to claim 1, wherein
the sound output control section performs control to output the notification sound regarding the moving body that comes into a predetermined range of vicinity of the mobile object.

13. The information processing apparatus according to claim 1, wherein
the sound output control section controls an up-down-direction position of the sound image of the notification sound on a basis of an up-down-direction position of the moving body in reference to a plane on which the moving body exists.

14. The information processing apparatus according to claim 13, wherein
the sound output control section controls the up-down-direction position of the sound image of the notification sound by controlling output of sounds from a plurality of speakers arranged at different heights in the mobile object.

15. The information processing apparatus according to claim 1, wherein
the sound output control section controls output of sounds from a plurality of speakers arranged in the mobile object in a manner surrounding a driver of the mobile object.

16. The information processing apparatus according to claim 1, wherein
the sound output control section shifts the position of the sound image of the notification sound in keeping with the detected position of the moving body in motion relative to the mobile object.

17. An information processing method comprising:
detecting a moving body near a mobile object on a basis of information input from sensors;
shifting a position of a sound image of a notification sound giving notification of a position of the moving body in keeping with a detected position of the moving body in motion; and
performing control to determine whether the moving body has a set priority of highest priority or of a priority lower than the highest priority, and if the set priority is the highest priority, output the notification sound, and if the set priority is the priority lower than the highest priority, not output the notification sound.

18. At least one non-transitory computer-readable storage medium storing processor-executable instructions that, when executed by at least one processor, cause the at least one processor to perform a method comprising:
detecting a moving body near a mobile object on a basis of information input from sensors;
shifting a position of a sound image of a notification sound giving notification of a position of the moving body in keeping with a detected position of the moving body in motion; and
performing control to determine whether the moving body has a set priority of highest priority or of a priority lower than the highest priority, and if the set priority is the highest priority, output the notification sound, and if the set priority is the priority lower than the highest priority, not output the notification sound.

19. A mobile object comprising:
sensors configured to be arranged in the mobile object to detect peripheral status thereof;
a moving body detection section configured to detect a moving body nearby on a basis of information input from the sensors; and
a sound output control section configured to shift a position of a sound image of a notification sound giving notification of a position of the moving body in keeping with a detected position of the moving body in motion,
wherein the sound output control section performs control to determine whether the moving body has a set priority of highest priority or of a priority lower than the highest priority, and if the set priority is the highest priority, output the notification sound, and if the set priority is the priority lower than the highest priority, not output the notification sound.

* * * * *